United States Patent
Katsuta

(10) Patent No.: US 10,496,219 B2
(45) Date of Patent: Dec. 3, 2019

(54) INPUT DETECTION DEVICE WITH DIFFERENT SWITCH SIZES

(71) Applicant: Japan Display Inc., Tokyo (JP)

(72) Inventor: Tadayoshi Katsuta, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 55 days.

(21) Appl. No.: 15/669,325

(22) Filed: Aug. 4, 2017

(65) Prior Publication Data

US 2018/0039373 A1 Feb. 8, 2018

(30) Foreign Application Priority Data

Aug. 5, 2016 (JP) .................................. 2016-154236

(51) Int. Cl.
| | |
|---|---|
| G06F 3/041 | (2006.01) |
| G06F 3/044 | (2006.01) |
| G06F 3/0354 | (2013.01) |
| G06F 3/046 | (2006.01) |

(52) U.S. Cl.
CPC ........ *G06F 3/0416* (2013.01); *G06F 3/03545* (2013.01); *G06F 3/044* (2013.01); *G06F 3/046* (2013.01); *G06F 3/0412* (2013.01); G06F 2203/04106 (2013.01)

(58) Field of Classification Search
CPC .... G06F 3/03545; G06F 3/0412; G06F 3/046; G06F 3/044; G06F 3/0416; G06F 2203/04106
See application file for complete search history.

(56) References Cited

U.S. PATENT DOCUMENTS

| | | | |
|---|---|---|---|
| 5,936,886 A | 8/1999 | Fujio et al. | |
| 2007/0124515 A1* | 5/2007 | Ishikawa | G06F 3/046 710/15 |
| 2015/0116194 A1* | 4/2015 | Matsui | G09G 3/3266 345/100 |
| 2015/0185942 A1* | 7/2015 | Kim | G06F 3/0412 345/173 |

FOREIGN PATENT DOCUMENTS

| | | |
|---|---|---|
| JP | H10-049301 A | 2/1998 |
| JP | H10-125875 | 5/1998 |
| JP | 2014-164770 | 9/2014 |

OTHER PUBLICATIONS

Japanese Office Action dated Sep. 24, 2019 in corresponding Japanese Patent Application No. 2016-154236 and English translation of same. 7 pages.

\* cited by examiner

*Primary Examiner* — Yaron Cohen
(74) *Attorney, Agent, or Firm* — K&L Gates LLP

(57) ABSTRACT

The input detection device includes: first and second signal lines having ends and arranged to extend in a first direction; drive electrodes extending in a second direction intersecting the first direction and arranged in parallel to the first direction; a first switch connected between one end of each drive electrode and the first signal line; a second switch connected between the other end of each drive electrode and the second signal line; a driving signal circuit supplying a driving signal to ends of the first signal line and the second signal line; and a selection circuit controlling the first switch and the second switch when it is detected that an external object is close. A size of the first switch connected to be close to the end of the first signal line is made smaller than a size of the first switch connected to be farther than the close first switch from the end.

12 Claims, 18 Drawing Sheets

INPUT DETECTION DEVICE WITH DIFFERENT SWITCH SIZES

CROSS-REFERENCE TO RELATED APPLICATION

The present application claims priority from Japanese Patent Application No. 2016-154236 filed on Aug. 5, 2016, the content of which is hereby incorporated by reference into this application.

TECHNICAL FIELD OF THE INVENTION

The present invention relates to an input detection device. More particularly, the present invention relates to an input detection device with a touch detection function capable of detecting that an external object is close to the device.

BACKGROUND OF THE INVENTION

In recent years, as an input detection device, attention has been paid to an input detection device with a touch detection function, which is so called touch panel, capable of detecting that an external object is close to (hereinafter, also in contact with) the device. A touch panel is mounted on a display apparatus such as a liquid crystal display apparatus or integrated with a liquid crystal display apparatus so as to be provided as a display apparatus with a touch detection function.

As the external object, a touch panel enabled to use, for example, a pen is known. By enabling the touch panel to use a pen, for example, a small region can be assigned or hand-written characters can be input. Various techniques to detect the touch by a pen are known. As one of the various techniques, an electromagnetic induction system is known. In the electromagnetic induction system, high accuracy and high handwriting pressure detection accuracy can be achieved, and a hovering detection function in a state in which an external object is separated from the touch panel surface can be also achieved, and therefore, the system is a leading technique as the technique to detect the touch by a pen.

A touch detection device capable of detecting a finger, etc., as the external object is known. In this case, an object to be detected is different from the pen, and therefore, a system different from the electromagnetic induction system is employed for the touch detection technique. For example, systems of detecting optical change, resistance value change, or electric field change, caused by the finger touch, etc., are cited. As the system of detecting the electric field change among these systems, for example, an electrostatic capacitive system utilizing a capacitance is cited. This electrostatic capacitive system has a relatively simple structure and less power consumption, and therefore, is used for a portable information terminal, etc.

The technique related to the touch panel of the electromagnetic induction system is described in, for example, Japanese Patent Application Laid-Open Publication No. H10-49301 (Patent Document 1).

SUMMARY OF THE INVENTION

In an electromagnetic induction method, an input detection device is provided with, for example, a coil for generating a magnetic field (hereinafter also referred to as a magnetic-field generation coil) and a coil for detecting a magnetic field (hereinafter also referred to as a magnetic-field detection coil). Inside a pen which is an external object, a coil and a capacitive element which configures a resonance circuit are embedded. The coil in the pen generates an induced voltage by the magnetic field generated by the magnetic field generation coil, so that the capacitive element is charged. The magnetic-field detection coil detects the magnetic field generated by the coil in the pen in accordance with a charge amount stored in the capacitive element. Thus, it can be detected whether the pen is in close to the device or not.

In order to extract a position (region) to which the pen is in close, the input detection device includes a plurality of magnetic field generation coils arranged at different positions from one another, and the magnetic field generation coils are driven by a magnetic-field driving signal so as to generate magnetic fields at different timings from one another. Here, first and second magnetic field generation coils which are arranged at different positions from one another are assumed. When an arrangement of the first and second magnetic field generation coils and a driving signal circuit which generates the magnetic-field driving signal is viewed in a plan view, the second magnetic field generation coil which is farther than the first magnetic field generation coil from the driving signal circuit is generated. Thus, a signal line which supplies the driving signal from the driving signal circuit to the second magnetic field generation coil which is farther from the driving signal circuit than the first magnetic field generation coil (referred to also as the close magnetic field generation coil below) becomes longer than a signal line which supplies the driving signal to the close magnetic field generation coil. By the long signal line, a resistance caused by the signal line becomes high. Therefore, a current flowing when a magnetic field is generated in the far magnetic field generation coil adversely becomes smaller than a current flowing through the close magnetic field generation coil. The magnetic field generated by the magnetic field generation coil becomes strong or weak depending on whether the flowing current is large or small. Therefore, in the input detection device, the strength of the generated magnetic field varies depending on the position (region). That is, the strength of the generated magnetic field changes depending on the position in a plane where the touch is detected.

When the magnetic field generated depending on the position becomes strong or weak, the charge amount stored in the capacitive element in the pen also changes depending on the touched position. As a result, the magnetic field generated by the coil in the pen also becomes strong or weak depending on the position. Therefore, detection sensitivity undesirably changes depending on the position.

Although Patent Document 1 describes the technique related to the touch panel of the electromagnetic induction method, it neither describes nor recognizes the change in the detection sensitivity depending on the position.

An input detection device according to an aspect of the present invention includes a substrate, a first signal line and a second signal line each of which has an end connected to a driving signal circuit that supplies a driving signal and each of which is arranged so as to extend in a first direction of the substrate, a plurality of drive electrodes which extend in a second direction intersecting the first direction of the substrate and which are arranged in the first direction, a plurality of first switches which are arranged along the first signal line and which can connect ends of a plurality of drive electrodes and the first signal line, a plurality of second switches which are arranged along the second signal line and which can connect the ends of the plurality of drive electrodes and the second signal line, and a selection circuit which controls the plurality of first switches and the plurality of second switches when it is detected that an external object is close. Here, a size of the first switch arranged to be close to the end of the first signal line connected to the driving signal circuit is smaller than a size of the first switch arranged to be far from the end.

BRIEF DESCRIPTIONS OF THE DRAWINGS

DESCRIPTIONS OF THE PREFERRED EMBODIMENTS

Figure 1A:
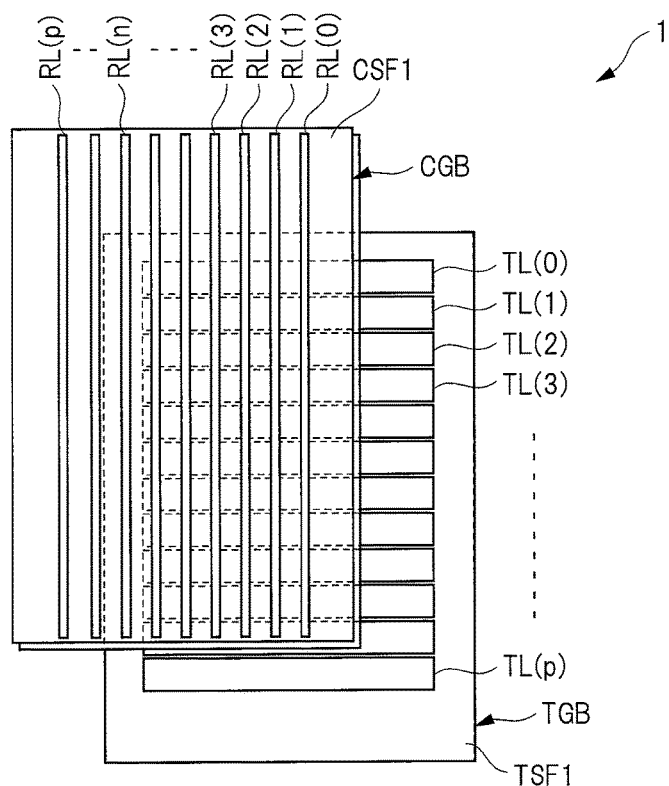
FIG. 1A and FIG. 1B are a plan view and a cross-sectional view showing a configuration of a display apparatus.

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are shown more schematically for a width, a thickness, a shape, and others of each portion than those in an actual aspect in some cases. However, they are merely examples, and do not limit the interpretation of the present invention.

An object of the present invention is to provide an input detection device capable of suppressing the change in the detection sensitivity depending on the position. In the present specification and each drawing, similar elements to those described earlier for the already-described drawings are denoted by the same reference characters, and detailed description for them is appropriately omitted in some cases. The following explanation will be made while a liquid crystal display apparatus with a touch detection function is exemplified as an input detection device. However, the display apparatus is not limited to this. For example, the input detection device may be an OLED display apparatus with a touch detection function, a touch panel without a display function, or others.

First Embodiment

First embodiment provides a liquid crystal display apparatus with a touch detection function (hereinafter, referred to also as display apparatus) capable of detecting both of a touch by a pen and a touch by a finger. First, a basic configuration of a display apparatus will be explained, and then, principles of a magnetic-field detection for detecting the touch by a pen (hereinafter, referred to also as magnetic field touch detection) and an electric-field detection for detecting the touch by a finger (hereinafter, referred to also as electric field touch detection) will be explained based on this basic configuration.

<Basic Configuration of Display Apparatus>

Figure 1B:
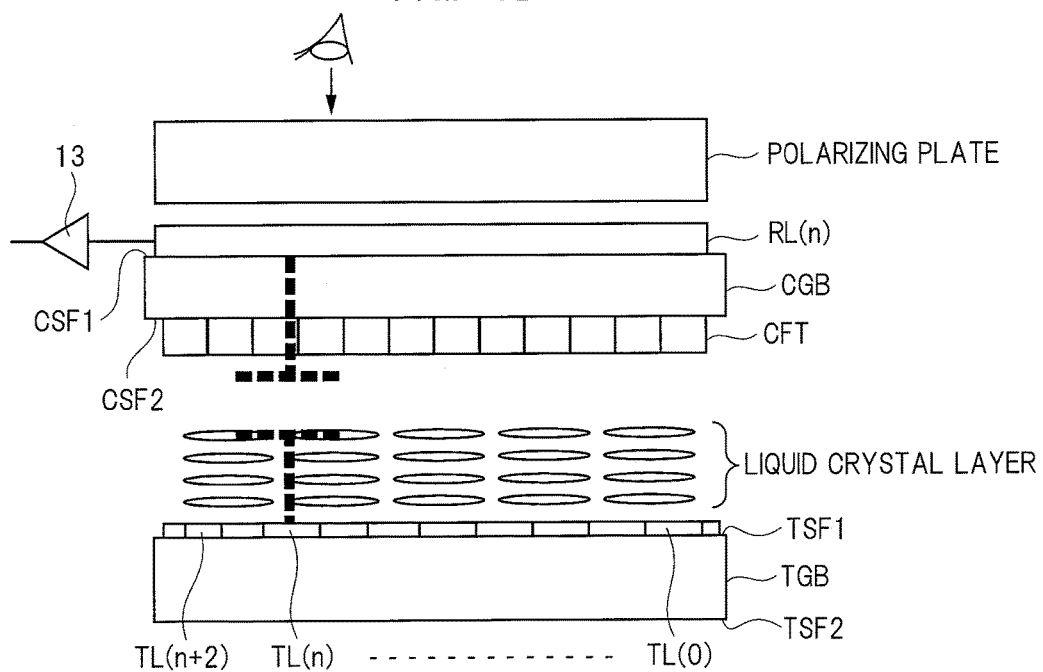

FIG. 1A and FIG. 1B are views that schematically show a configuration of a display apparatus. In FIG. 1A and FIG. 1B, a reference character 1 indicates the display apparatus, FIG. 1A is a plan view showing a plane of the display apparatus 1, and FIG. 1B is a cross-sectional view showing a cross section of the display apparatus 1. The display apparatus 1 is provided with a TFT (Thin Film Transistor) glass substrate (hereinafter, referred to also as insulating first substrate or simply first substrate) TGB, a layer stacked on the first substrate TGB, a color filter CFT, a CF (color filter) glass substrate (hereinafter, referred to also as insulating second substrate or simply second substrate) CGB, and a layer stacked on the second substrate CGB.

In FIG. 1A, reference characters TL(0) to TL(p) indicate drive electrodes configured by layers formed on a first main surface TSF1 of the first substrate TGB. Moreover, reference characters RL(0) to RL(p) indicate detection electrodes configured by layers formed on a first main surface CSF1 of the second substrate CGB. In FIG. 1A, for easiness of understanding, the first substrate TGB and the second substrate CGB are separately shown. However, practically, the first main surface TSF1 of the first substrate TGB and the second main surface CSF2 of the second substrate CGB are opposed to each other across a liquid crystal layer as shown in FIG. 1B.

A plurality of layers, the liquid crystal layer, and the like, are sandwiched between the first main surface TSF1 of the first substrate TGB and the second main surface CSF2 of the second substrate CGB. FIG. 1B shows only the drive electrodes TL(0) to TL(n+2), the liquid crystal layer and the color filter CFT, sandwiched between the first main surface TSF1 and the second main surface CSF2. Moreover, as shown in FIG. 1A, on the first main surface CSF1 of the second substrate CGB, the plurality of detection electrodes RL(0) to RL(p) and a polarizing plate are arranged. Further-more, in FIG. 1B, a reference character 13 indicates a unit detection circuit connected to the detection electrode RL(n).

In the present specification, as shown in FIG. 1B, a state of the display apparatus 1 when viewed from the first main surfaces CSF1 and TSF1 of the second substrate CGB and the first substrate TGB is explained as a plan view. When viewed as the plan view from the first main surfaces CSF1 and TSF1, the drive electrodes TL(0) to TL(p) extend in a row (horizontal) direction and are arranged in parallel with one another in a column (vertical) direction on the first main surface TSF1 of the first substrate TGB as shown in FIG. 1A. Moreover, on the first main surface CSF1 of the second substrate CGB, the detection electrodes RL (0) to RL (p) extend in the column (vertical) direction and are arranged in parallel with one another in the row (horizontal) direction as shown in FIG. 1A.

The second substrate CGB, the liquid crystal layer and others are interposed between the drive electrodes TL(0) to TL(p) and the detection electrodes RL(0) to RL(p). For this reason, while the drive electrodes TL(0) to TL(p) and the detection electrodes RL(0) to RL(p) intersect with each other in a plan view, those electrodes are electrically separated from each other. Since capacitances exist between the drive electrodes and the detection electrodes, each capacitance is shown by a broken line as a capacitive element in FIG. 1B.

In a plan view, it is desirable to arrange the drive electrodes TL(0) to TL(p) and the detection electrodes RL(0) to RL(p) so as to be orthogonal to each other. However, in a plan view, the drive electrodes and the detection electrodes may intersect with each other while tilting. Therefore, in the following explanation, it should be understood that the term "being orthogonal" includes the term "intersecting".

<Principle of Magnetic-Field Detection>

Figure 2A:
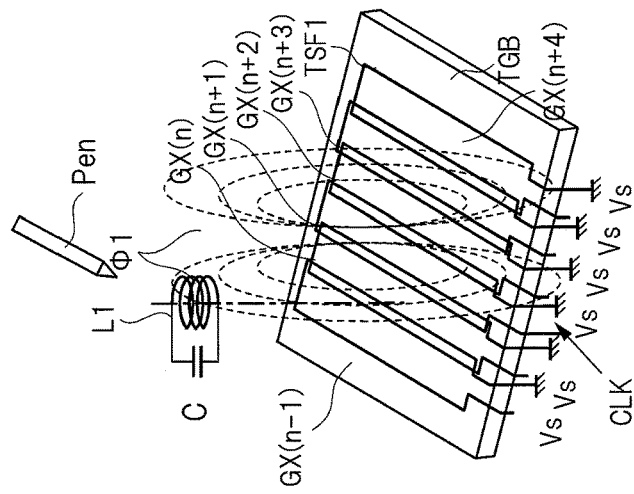
FIG. 2A to FIG. 2C are explanatory diagrams showing a principle of magnetic-field detection.
Figure 2B:
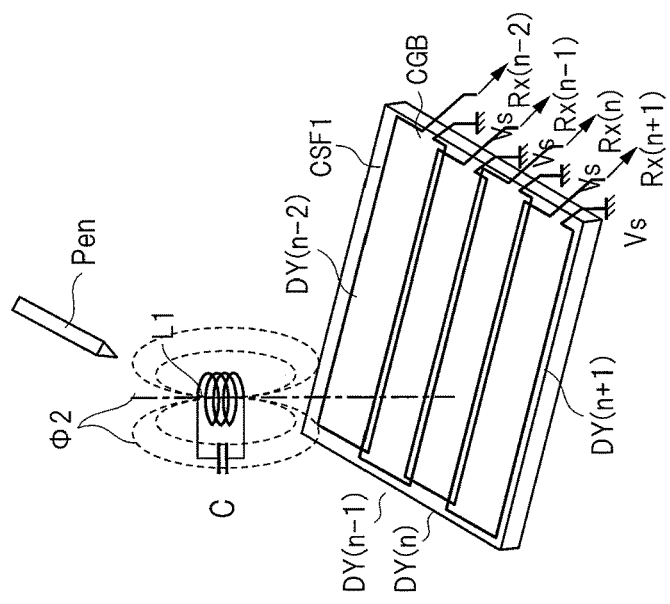
Figure 2C:
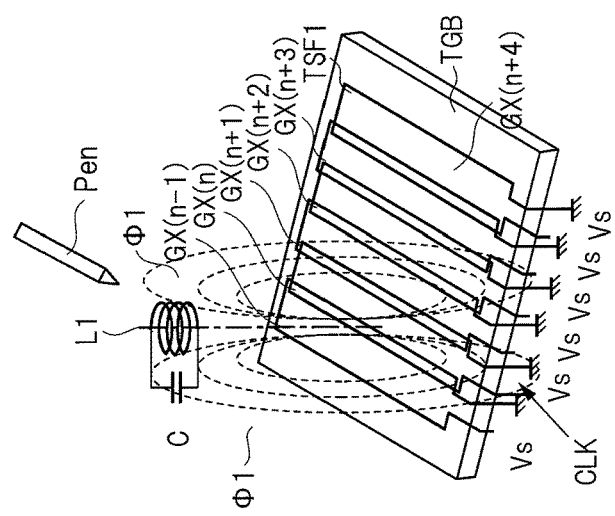

FIG. 2 is an explanatory diagram showing the principle of magnetic-field detection. The period of magnetic-field detection is composed of a magnetic-field generation period in which a magnetic field is generated and a magnetic-field detection period in which the magnetic field is detected. FIG. 2A and FIG. 2C show operations during the magnetic-field generation period, and FIG. 2B shows an operation during the magnetic-field detection period. For convenience of explanation, each of FIG. 2A to FIG. 2C shows a state obtained by rotating FIG. 1A by 90 degrees.

In the magnetic-field generation period, ends of predetermined drive electrodes of the drive electrodes TL(0) to TL(p) are electrically connected to each other. Further, a predetermined voltage (for example, ground voltage Vs) and a magnetic-field driving signal are supplied to the drive electrodes the ends of which are connected. For example, the other ends of the drive electrodes TL(0) and TL(2) shown in FIG. 1 are electrically connected to each other on the right side of FIG. 1. Thus, the drive electrodes TL(0) and TL(2) which are arranged in parallel with each other are connected in series with each other. Moreover, the ground voltage Vs is supplied to one end of the drive electrode TL(0) on the left side of FIG. 1, and the magnetic-field driving signal is also supplied to one end of the drive electrode TL(2) on the left side of FIG. 1. Here, the magnetic-field driving signal is a signal whose voltage periodically changes. By the drive electrodes TL(0) and TL(2), a magnetic-field generation coil having a region sandwiched by these drive electrodes inside the magnetic-field generation coil is configured, and this magnetic-field generation coil generates the magnetic field inside the magnetic-field generation coil in accordance with the voltage change of the magnetic-field generation signal.

In FIG. 2A, a reference character GX(n−1) indicates a magnetic-field generation coil configured by the drive electrodes TL(0) and TL(2). As similar to the magnetic-field generation coil GX(n−1), reference characters GX(n) to GX(n+4) indicate magnetic-field generation coils configured by the drive electrodes TL(1), TL(3) to TL(p).

In FIG. 2A, reference characters "C" and "L1" indicate a capacitive element and a coil that are embedded in a pen "Pen". The capacitive element C and the coil L1 are connected in parallel with each other so as to configure a resonance circuit. During the magnetic-field generation period, the ground voltage Vs is supplied to one end of each of the magnetic-field generation coils GX(n−1) to GX(n+3). A magnetic-field driving signal CLK is supplied to the other end of the magnetic-field generation coil GX(n). Thus, the magnetic-field generation coil GX(n) generates a magnetic field $\phi 1$ in accordance with the voltage change of the magnetic-field driving signal CLK. When the pen "Pen" is close to the magnetic-field generation coil GX(n), the magnetic-field generation coil GX(n) and the coil L1 are electromagnetically coupled to each other, and an induced voltage is generated in the coil L1 based on mutual induction by the magnetic field $\phi 1$, so that the capacitive element C is charged.

Next, the sequence proceeds to the magnetic-field detection period shown in FIG. 2B. In the magnetic-field detection period, the magnetic field is detected by using the detection electrodes RL(0) to RL(p). Each of the detection electrodes RL(0) to RL(p) has a pair of ends. The other ends of predetermined detection electrodes of the detection electrodes RL(0) to RL(p) are electrically connected to each other. For example, the other ends of the detection electrodes RL(0) and RL(3) shown in FIG. 1 are electrically connected to each other on the upper side of FIG. 1. Thus, the detection electrodes RL(0) and RL(3) arranged in parallel with each other are connected in series with each other. In the magnetic-field detection period, the predetermined voltage Vs is supplied to one end of the detection electrode RL(3), and one end of the detection electrode RL(0) is connected to the unit detection circuit. Thus, a magnetic-field detection coil having a region (formed region) sandwiched by the detection electrodes RL(0) and RL(3) inside the magnetic-field generation coil is formed, and the magnetic field caused from the pen "Pen" is detected by this magnetic-field detection coil.

In FIG. 2B, a reference character DY(n−2) indicates a magnetic-field detection coil configured by the detection electrodes RL(0) and RL(3), and reference characters DY(n−1) to DY(n+1) similarly indicate magnetic-field detection coils configured by the detection electrodes RL(2) to RL(p). During the magnetic-field detection period, the predetermined voltage Vs is supplied to one end of each of the magnetic-field detection coils DY(n−1) to DY(n+1), and each of signals Rx(n−2) to Rx(n+1) on the other end thereof is supplied to the unit detection circuit.

If the capacitive element C is charged in the magnetic-field generation period, the coil L1 generates a magnetic field $\phi 2$, that changes in response to a resonance frequency of the resonance circuit, in accordance with the charge in the capacitive element C. In FIG. 2B, the center (indicated by a one-dot chain line) of the coil L1 is located inside the magnetic-field detection coil DY(n). For this reason, the magnetic-field detection coil DY(n) and the coil L1 are electromagnetically coupled, so that an induced voltage is generated in the magnetic-field detection coil DY(n) by mutual induction between these coils. As a result, the signal Rx(n) on the other end of the magnetic-field detection coil DY(n) is changed in response to the charge amount in the capacitive element C. The unit detection circuit connected to the magnetic-field generation coil DY(n) outputs the change in the signal Rx(n) as a detection signal. Thus, it can be detected whether or not the pen Pen is closely located (or touched), or coordinates of the pen Pen can be detected. Moreover, since the detection signal is changed in response to the charge amount, a distance from the pen Pen can be obtained.

FIG. 2C shows the magnetic-field generation period to which the sequence proceeds successively from the state of FIG. 2B. A difference from FIG. 2A is that the magnetic-field driving signal CLK is supplied to the magnetic-field generation coil GX(n+1). Since the position of the pen Pen has not been changed, the induced voltage is not generated in the coil L1 during the magnetic-field generation period shown in FIG. 2C, so that the capacitive element C is not charged. Thus, during the magnetic-field detection period to which the sequence proceeds successively from the state of FIG. 2C, it is detected that the pen Pen is not closely located. Thereafter, similarly, the pen Pen is detected.

<Principle of Electric-Field Detection>

Figure 3A:
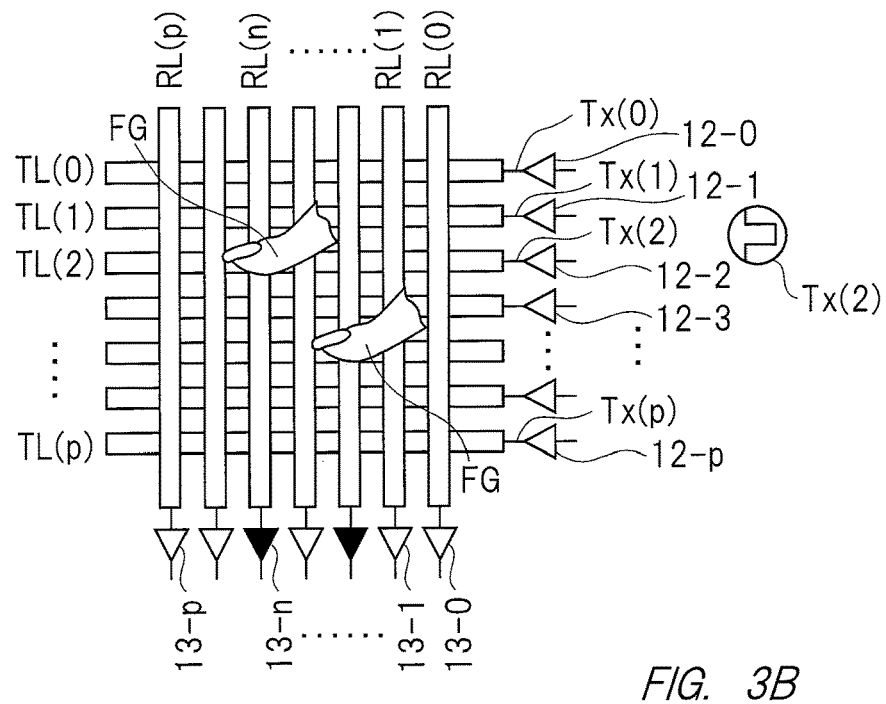
FIG. 3A to FIG. 3C are explanatory diagrams showing a principle of electric-field detection.
Figure 3B:
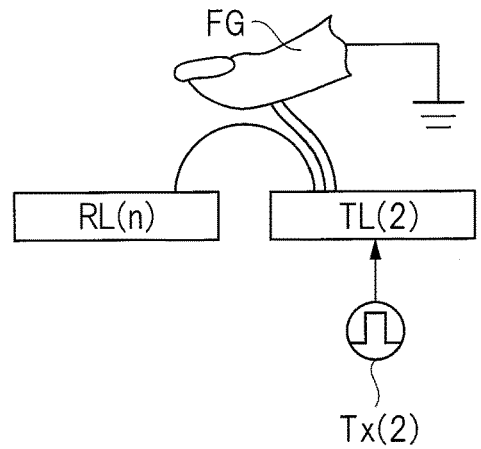
Figure 3C:
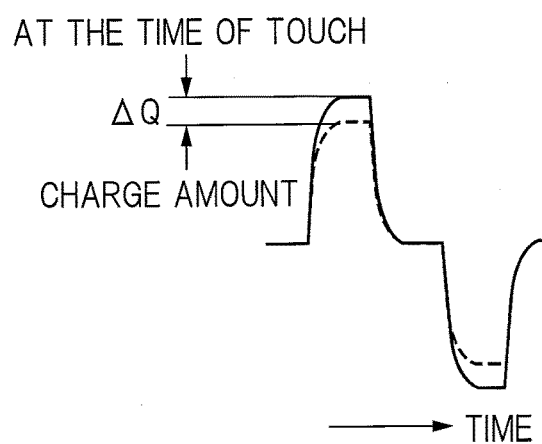

FIG. 3A to FIG. 3C are explanatory diagrams showing the principle of the electric-field detection. In FIG. 3A, each of reference characters 12-0 to 12-*p* indicates a unit drive circuit that outputs an electric-field driving signal. Each of reference characters 13-0 to 13*p* indicates a unit detection circuit. Moreover, in FIG. 3A, a pulse signal surrounded by a solid-line circle indicates a waveform of an electric-field driving signal Tx(2) to be supplied to the drive electrode TL(2). A finger as the external object is indicated by a reference character "FG".

When the electric-field driving signal Tx(2) is supplied to the drive electrode TL(2), an electric field is generated between the drive electrode TL(2) and the detection electrode RL(n) that is orthogonal to the drive electrode TL(2) as shown in FIG. 3B. At this time, when the finger FG is touching the vicinity of the drive electrode TL(2), an electric field is also generated between the finger FG and the drive electrode TL(2). For this reason, the electric field generated between the drive electrode TL(2) and the detection electrode RL(n) is reduced. Thus, the charge amount between the drive electrode TL(2) and the detection electrode RL(n) is reduced. As a result, as shown in FIG. 3C, when the finger FG is touching, the charge amount which is generated in response to the supply of the driving signal Tx(2) is smaller by ΔQ than that when the finger FG is not touching. The difference in the charge amount is supplied to the unit detection circuit 13-*n* as a difference in voltages, and is output as a detection signal.

Also in other drive electrodes, the signal voltage change caused depending on whether the finger FG is touching or not is similarly generated in the detection electrodes RL(0) to RL(n) by the supply of the electric-field driving signal, and is output as the detection signal. Therefore, it can be detected whether the finger FG is touching or not, and the coordinates of the touching can be detected.

As described above, in the detection of the magnetic field, the magnetic-field driving signal is supplied to the selected drive electrode of the drive electrodes TL(0) to TL(p). Moreover, in the detection of the electric field, the electric-field driving signal is supplied to the selected drive electrode thereof. On the other hand, in the display, the display driving signal is supplied to the drive electrodes TL(0) to TL(p). Since the drive electrodes TL(0) to TL(p) are set to the same voltage by the display driving signal, the drive electrodes TL(0) to TL(p) can be regarded as a single common electrode.

<Overview of Display Apparatus>

Figure 4:
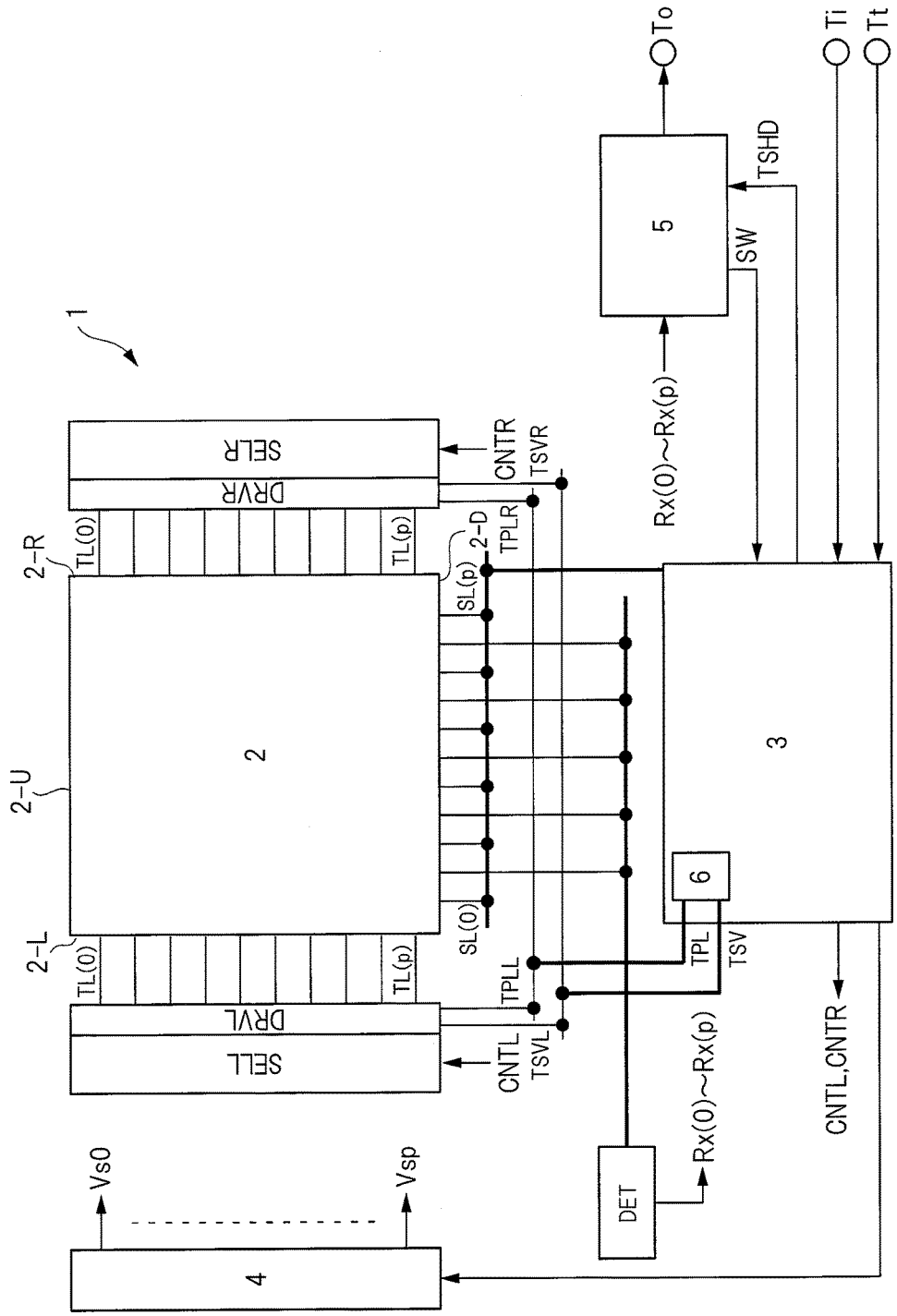
FIG. 4 is a block diagram showing a configuration of the display apparatus according to a first embodiment.

FIG. 4 is a block diagram showing the configuration of the display apparatus 1 according to the first embodiment. In FIG. 4, the display apparatus 1 includes a display panel (liquid crystal panel), a control device 3, a gate driver 4, and a touch control device 5. The display apparatus 1 also includes selection circuits SELL and SELR, drive circuits DRVL and DRVR, and a detection circuit DET. The display panel includes a display region (display portion) where the display is performed and a peripheral region (peripheral portion). From the viewpoint of the display, the display region is an active region, and the peripheral region surrounding the display region is a non-active region. In FIG. 4, a reference character 2 indicates the display region.

The display region 2 has a pixel array in which a plurality of pixels are arranged in a matrix form. In the pixel array, a plurality of signal lines, a plurality of drive electrodes, a plurality of scan lines, and a plurality of detection electrodes are arranged. In the description with reference to FIG. 4, the signal lines SL(0) to SL(p) extend in a vertical direction (column direction) and are arranged in parallel in a horizontal direction (row direction). The drive electrodes TL(0) to TL(p) extend in the horizontal direction and are arranged in parallel in the vertical direction. Further, the scan lines extend in the horizontal direction and are arranged in parallel in the vertical direction. And, the detection electrodes extend in the vertical direction and are arranged in parallel in the horizontal direction. In this case, a pixel is arranged in a space formed by intersecting the plurality of signal lines with the plurality of scan lines. In a period of display (display period), pixels are selected by signal lines and scan lines. To the selected pixels, the voltage of the signal line and the voltage of the drive electrode at that time are applied. And, display is performed in accordance with a voltage difference between the signal line and the drive electrode.

The control device 3 receives a timing signal supplied to an external terminal Tt and image information supplied to an input terminal Ti, forms an image signal in accordance with the image information in the display, and supplies the image signal to the plurality of signal lines SL(0) to SL(p). Also, the control device 3 receives a timing signal supplied to the external terminal Tt and a control signal SW from the touch control device 5, and forms various signals. In FIG. 4, only signals required for the explanation are shown as representatives. That is, the control device 3 forms a synchronization signal TSHD and control signals CNTL and CNTR. Also, although not particularly limited, the control device 3 includes a driving signal circuit 6 which forms the drive signals TPL and TSV.

The synchronization signal TSHD is a synchronization signal for identifying the display period during which the display is performed in the display region 2 and the touch detection period during which the touch detection (magnetic field touch detection and electric field touch detection) is performed. The control device 3 performs control so that the touch control device 5 operates during the touch detection period by the synchronization signal TSHD.

In the display, the gate driver 4 forms scan line signals Vs0 to Vsp in accordance with a timing signal from the control device 3, and supplies the scan line signals Vs0 to Vsp to scan lines in the display region 2. In the display period, a pixel connected to a scan line to which a scan signal with a high level is supplied is selected, and this selected pixel displays an image in accordance with an image signal that is supplied to the signal line SL(0) to SL(p) at this time.

In the magnetic field touch detection and the electric field touch detection, the detection circuit DET detects the signal change in the detection electrodes RL(0) to RL(p), and outputs the change as the detection signals Rx(0) to Rx(p).

The touch control device 5 receives the detection signals Rx(0) to Rx(p), extracts coordinates of the touched position, and outputs the coordinates from an external terminal To. The touch control device 5 outputs the control signal SW, and receives the synchronization signal TSHD and operates in synchronization with the control device 3.

The display region 2 has sides 2-U, 2-D parallel to the row of the pixel array and sides 2-R, 2-L parallel to the column of the pixel array. Here, the side 2-U and the side 2-D are sides opposite to each other, and the plurality of drive electrodes and the plurality of scan lines in the pixel array are arranged between the two sides. The side 2-R and the side 2-L are also sides opposite to each other, and the plurality of signal lines and the plurality of detection electrodes in the pixel array are arranged between the two sides.

In the magnetic field touch detection and the electric field touch detection, the selection circuits SELL and SELR form selection signals for selecting the drive electrodes from the drive electrodes TL(0) to TL(p) based on the control signals CNTL and CNTR, respectively.

In FIG. 4, each of reference characters TPLL, TPLR, TSVL, and TSVR indicates a signal line. The signal lines TPLL and TSVL extend along the side 2-L of the display region 2, and are arranged inside the drive circuit DRVL. Similarly, the signal lines TPLR and TSVR extend along the side 2-R of the display region 2, and are arranged inside the drive circuit DRVR. The drive circuit DRVL corresponds to the selection circuit SELL, and connects the drive electrode designated by the selection signal from the selection circuit SELL to the signal line TPLL or TSVL in the magnetic field touch detection and the electric field touch detection. Similarly, the drive circuit DRVR corresponds to the selection circuit SELR, and connects the drive electrode designated by the selection signal from the selection circuit SELR to the signal line TPLR or TSVR in the magnetic field touch detection and the electric field touch detection.

The driving signals TPL and TSV formed by a driving signal circuit 6 included in the control device 3 are supplied to respective ends of the signal lines TPLL, TPLR, TSVL and TSVR. Although described later, in the magnetic field touch detection, the driving signals TPL and TSV, which propagate through the signal lines TPLL, TPLR, TSVL and TSVR, are supplied to the selected drive electrode via the drive circuit DRVL or DRVR to generate a magnetic field. In the electric field touch detection, the driving signal TSV, which propagates through the signal lines TSVL and TSVR, is supplied to the selected drive electrode via the drive circuit DRVL or DRVR to generate an electric field. Each of the signal lines TPLL and TPLR is also referred to as a first signal line, and each of the signal lines TSVL and TSVR is also referred to as a second signal line in some cases. Further, when the signal lines TPLL and TPLR are made distinct from each other, the signal line TPLL is referred to as a first signal line, and the signal line TPLR is referred to as a fourth signal line in some cases. Similarly, when the signal lines TSVR and TSVL are made distinct from each other, the signal line TSVR is referred to as a second signal line, and the signal line TSVL is referred to as a third signal line in some cases.

<Module Configuration of Display Apparatus 1>

Figure 5:
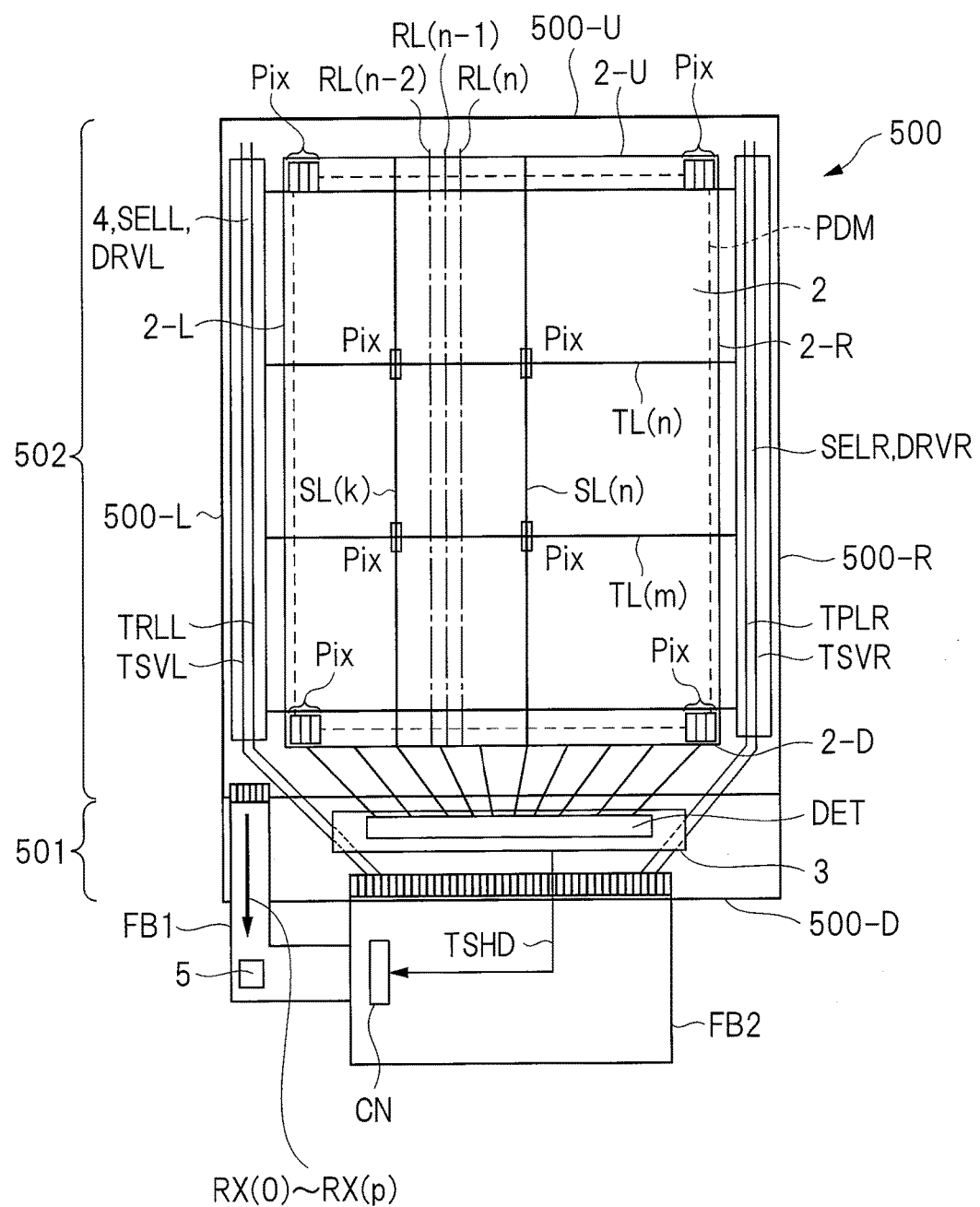
FIG. 5 is a plan view showing a configuration of a module according to the first embodiment.

FIG. 5 is a schematic plan view showing an overall configuration of a module 500 mounted with the display apparatus 1. Although schematically shown, FIG. 5 shows practical arrangement. In this drawing, a reference character 501 indicates a region of the first substrate TGB shown in FIG. 1, and a reference character 502 indicates a region where the first substrate TGB and the second substrate CGB are stacked. In the module 500, the first substrate TGB is integrated in the regions 501 and 502. Also, in the region 502, the second substrate CGB is mounted on the first substrate TGB so that the first main surface TSF1 of the first substrate TGB and the second main surface CSF2 of the second substrate CGB are opposite to each other. In FIG. 5, reference characters 500-U and 500-D indicate short sides of the module 500, and reference characters 500-L and 500-R indicate long sides of the module 500.

The gate driver 4, the selection circuit SELL and the drive circuit DRVL shown in FIG. 4 are arranged in a region between the side 2-L of the display region 2 and the long side 500-L of the module 500 in the region 502. The selection circuit SELR and the drive circuit DRVR shown in FIG. 4 are arranged in a region between the side 2-R of the display region 2 and the long side 500-R of the module 500. The detection circuit DET is formed of lines and components formed on the first main surface TSF1 of the first substrate TGB in the region 501. In a plan view, the control device 3 is mounted on the first substrate TGB so as to cover the detection circuit DET. Also, the lines and components configuring the selection circuits SELL and SELR and the drive circuits DRVL and DRBR are also formed on the first main surface TSF1 of the first substrate TGB in the region 502.

The detection signals Rx(0) to Rx(p) described in FIG. 4 are supplied to the touch control device 5 through lines in the flexible cable FB1. A flexible cable FB2 is connected to the region 501. Through a connector CN mounted on the flexible cable FB2, signals are transmitted/received between the touch control device 5 and the control device 3.

As described above, the display region 2 includes the pixel array in which a plurality of pixels are arranged in a matrix form. The pixel array has the plurality of drive electrodes TL(0) to TL(p) and the plurality of scan lines arranged along a row in the pixel array, and the plurality of signal lines SL(0) to SL(p) and the plurality of detection electrodes RL(0) to RL(p) arranged along a column in the pixel array. In FIG. 5, two drive electrodes TL(n) and TL(m), two signal lines SL(k) and SL(n), and three detection electrodes RL(n−2) to RL(n) are shown as an example. In FIG. 5, the horizontal direction is the row direction of the pixel array, and the vertical direction is the column direction of the pixel array. Therefore, the exemplified drive electrodes TL(n) and TL(m) extend in the horizontal direction and are arranged in parallel in the vertical direction. Further, the exemplified signal lines SL(k) and SL(n) extend in the vertical direction and are arranged in parallel in the horizontal direction, and the exemplified detection electrodes RL(n−2) to RL(n) extend in the vertical direction and are arranged in parallel in the horizontal direction. Note that the scan lines are omitted in FIG. 5. However, the scan lines extend in parallel to the exemplified drive electrodes TL(n) and TL(m).

In FIG. 5, the pixel array is indicated as a broken line PDM, and each of pixels arranged at four corners of the display region 2 among the plurality of pixels arranged in the pixel array PDM and each of pixels arranged at intersections between the exemplified drive electrodes and signal lines are shown as "Pix".

Each of the signal lines TPLL and TSVL shown in FIG. 4 extends in the vertical direction (the column direction in the pixel array) in a region between the long side 500-L of the module 500 and the side 2-L of the display region 2. Similarly, each of the signal lines TPLR and TSVR extends in the vertical direction (direction of the pixel array: first direction) in a region between the long side 500-R of the module 500 and the side 2-R of the display region 2. When each extension direction of the drive electrodes TL(0) to TL(p) extend, i.e., the horizontal direction is regarded as a second direction, the signal lines SL(0) to SL(p), the detection electrodes RL(0) to RL(p), and the signal lines TPLL, TPLR, TSVL, and TSVR extend in the first direction orthogonal to (including "intersecting") the second direction. At this time, the omitted scan lines extend along the second direction.

FIG. 4 shows an example in which the control device 3 forms the driving signals TPL and TSV. However, the present invention is not limited to this, and the driving signals may be formed by another circuit block or others. When the driving signals are formed by another circuit block, for example, the signal lines TPLL, TPLR, TSVL, and TSVR are connected to the lines inside the flexible cable FB2 on the first main surface TSF1 of the first substrate TGB, and are connected to another circuit block. In FIG. 5, a broken line shown in the control device 3 indicates a case in which the driving signals TPL and TSV are formed by another circuit block. That is, in the signal lines TPLL, TPLR, TSVL and TSVR through which the driving signals formed by another circuit block (a driving signal circuit) are transmitted, each portion covered by the control device 3 is indicated by a broken line.

<Outline of Magnetic Field Generation Period>

A principle in performing the magnetic-field detection using the drive electrodes has been described with reference to FIG. 2. For easily understanding, FIG. 2 shows an example in which a magnetic field generation coil is formed by electrically connecting the drive electrodes to each other. The present inventor has considered a configuration which generates a magnetic field without electrically connecting the drive electrodes to each other and has applied the configuration to the display apparatus 1. Before the display apparatus 1 is explained in more detail, magnetic field generation considered by the present inventor is described.

FIG. 6 is a plan view for explaining an operation in the magnetic field generation period. In FIG. 6, reference characters TL(n−4) to TL(n+5) indicate the drive electrodes. The drive electrodes TL(n−4) to TL(n+5) are arranged in parallel to one another when viewed in a plan view, and each of the drive electrodes has a pair of ends n1 and n2. Here, the one end n1 of each of the drive electrodes TL(n−4) to TL(n+5) is arranged along the side 2-L of the display region 2, and the other end n2 thereof is arranged along the side 2-R of the display region 2.

A period for the magnetic field touch detection (hereinafter also referred to as a magnetic field touch detection period) for detecting whether the pen Pen (FIG. 2) is touching a region of the drive electrode TL(n) or not will be described as an example. In the magnetic field touch detection period, the drive electrodes TL(n−3) to TL(n−1) and TL(n+1) to TL(n+3) are driven so that a driving state shown in FIG. 6A and a driving state shown in FIG. 6B occur a plurality of times including once during the magnetic field generation period.

During the magnetic field generation period, the pair of drive electrodes arranged so as to sandwich the region of the drive electrode TL(n) where the magnetic field is generated are selected, and the selected pair of drive electrodes are driven so that currents respectively flowing through the drive electrodes are opposite to each other in direction. In FIG. 6, three adjacent drive electrodes (adjacent to one another) are bundled, and the bundled drive electrodes (hereinafter also referred to as bundle drive electrode) are used as a set of drive electrodes. That is, the drive electrodes TL(n−3) to TL(n−1) are bundled to form the bundle drive electrode, and the drive electrodes TL(n+1) to TL(n+3) are bundled to form the bundle drive electrode.

Figure 6A:
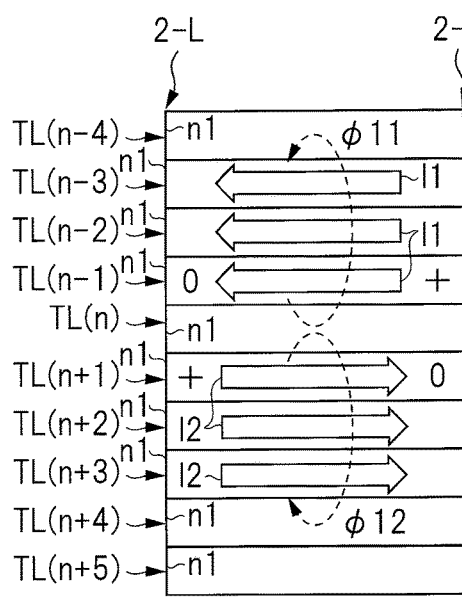
FIG. 6A and FIG. 6B are plan views each for describing an operation in a magnetic field generation period.

In FIG. 6A, a first voltage Vs such as a ground voltage is supplied to the one end n1 of each of the drive electrodes TL(n−3) to TL(n−1), and a second voltage Vd having a larger absolute value of a voltage value than that of the first voltage Vs is supplied to the other end n2 thereof. In the first embodiment, each of the first voltage Vs and the second voltage Vd is a direct-current voltage whose voltage value does not change with respect to time. Thus, in each of the drive electrodes TL(n−3) to TL(n−1), a current I1 in a direction heading from the other end n2 to the one end n1 of the drive electrode flows. As a result, the bundle drive electrode configured by the drive electrodes TL(n−3) to TL(n−1) generates a magnetic field φ11 in a direction indicated by a broken line in FIG. 6A. At this time, the second voltage Vd is supplied to the one end n1 of each of the drive electrodes TL(n+1) to TL(n+3), and the first voltage Vs is supplied to the other end 2 thereof. Thus, in each of the drive electrodes TL(n+1) to TL(n+3), a current I2 in a direction heading from the one end n1 to the other end n2 of the drive electrode flows. As a result, the bundle drive electrode configured by the drive electrodes TL(n+1) to TL(n+3) generates a magnetic field φ12 in a direction indicated by a broken line in FIG. 6A.

The directions of the magnetic fields φ11 and φ12 generated by the respective bundle drive electrodes are opposite to each other because the directions of the current I1 and the current I2 are opposite to each other, and are superimposed in the region of the drive electrode TL(n). Therefore, a strong magnetic field can be generated in the region of the drive electrode TL(n).

Figure 6B:
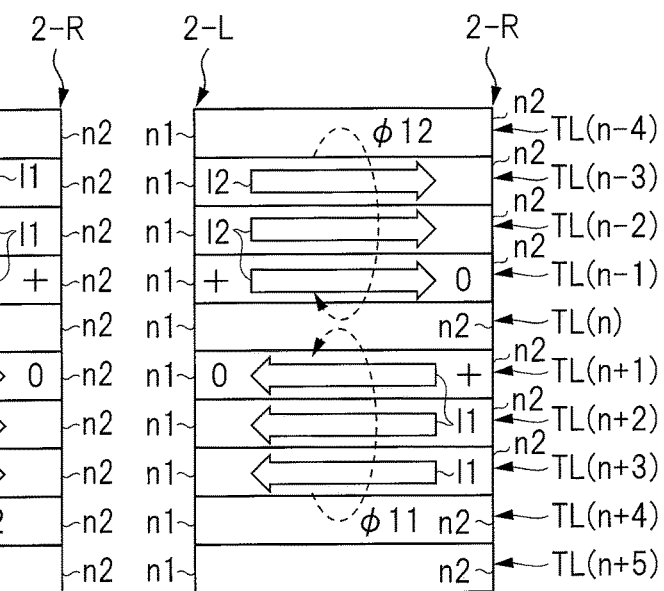

In FIG. 6B, a voltage supplied to a bundle drive electrode is made opposite to that in FIG. 6A. That is, a second voltage Vd is supplied to one end n1 of each of drive electrodes TL(n−3) to TL(n−1), and a first voltage Vs is supplied to the other end n2 thereof. At this time, the first voltage Vs is supplied to one end n1 of each of drive electrodes TL(n+1) to TL(n+3), and the second voltage Vd is supplied to the other end n2 thereof. Thus, a direction of a current flowing through the drive electrodes TL(n−3) to TL(n−1) is opposite to that of the current in FIG. 6A, and becomes I2. Thus, a direction of a generated magnetic field is also opposite, so that a magnetic field φ12 in a direction indicated by a broken line is generated. Similarly, a direction of a current flowing through the drive electrodes TL(n+1) to TL(n+3) is opposite, and a direction of a magnetic field is opposite so as to be a magnetic field φ11 indicated by a broken line. As a result, in the region of the drive electrode TL(n), the magnetic fields φ11 and φ12 are superimposed so that a strong magnetic field is generated.

Thus, even if the drive electrodes are not electrically connected to each other, the strong magnetic field can be generated in a desired drive electrode region. In FIG. 6, note that the first voltage Vs is indicated by "0", and the second voltage Vd is indicated by "+".

An electric charge is stored in the capacitive element in the pen Pen by the magnetic field generated in the magnetic field generation period, and the detection of the magnetic field generated by the pen Pen by using the magnetic-field detection coil in the magnetic-field detection period is similar to that in the above description with reference to FIG. 2.

<Configuration of Drive Electrodes DRVL and DRVR>

As described in FIGS. 6A and 6B, during the magnetic field generation period, the drive circuits DRVL and DRVR shown in FIG. 4 are controlled by the selection circuits SELL and SELR so that the first voltage Vs and the second voltage Vd are alternately supplied to the ends n1 and n2 of the selected drive electrode. At this time, the control device 3 supplies the drive signal TPL having the first voltage Vs to the respective ends of the signal lines TPLL and TPLR, and supplies the drive signal TSV having the second voltage Vd to the respective ends of the signal lines TSVL and TSVR.

The drive circuit DRVL can be configured by a plurality of first switches connected between the respective one ends n1 of the drive electrodes and the signal line TPLL and a plurality of second switches connected between the respective one ends n1 of the drive electrodes and the signal line TSVL. In this case, the first switches or the second switches are turned on (electrically conducted) by the selection signal from the corresponding selection circuit SELL. Thus, the first voltage Vs or the second voltage Vd can be supplied to the one end n1 of the selected drive electrode. Similarly, the drive circuit DRVR can also be configured by a plurality of first switches connected between the respective other ends n2 of the drive electrodes and the signal line TPLR and a plurality of second switches connected between the respective other ends n2 of the drive electrodes and the signal line TSVR. By switching control for the plurality of first switches and the plurality of second switches which configure the drive circuit DRVR by the selection signal from the corresponding selection circuit SELR, the second voltage Vd or the first voltage Vs is supplied to the other end n2 of the selected drive electrode.

First, the present inventor has considered that the first switch and the second switch have the same size as each other.

Figure 7A:
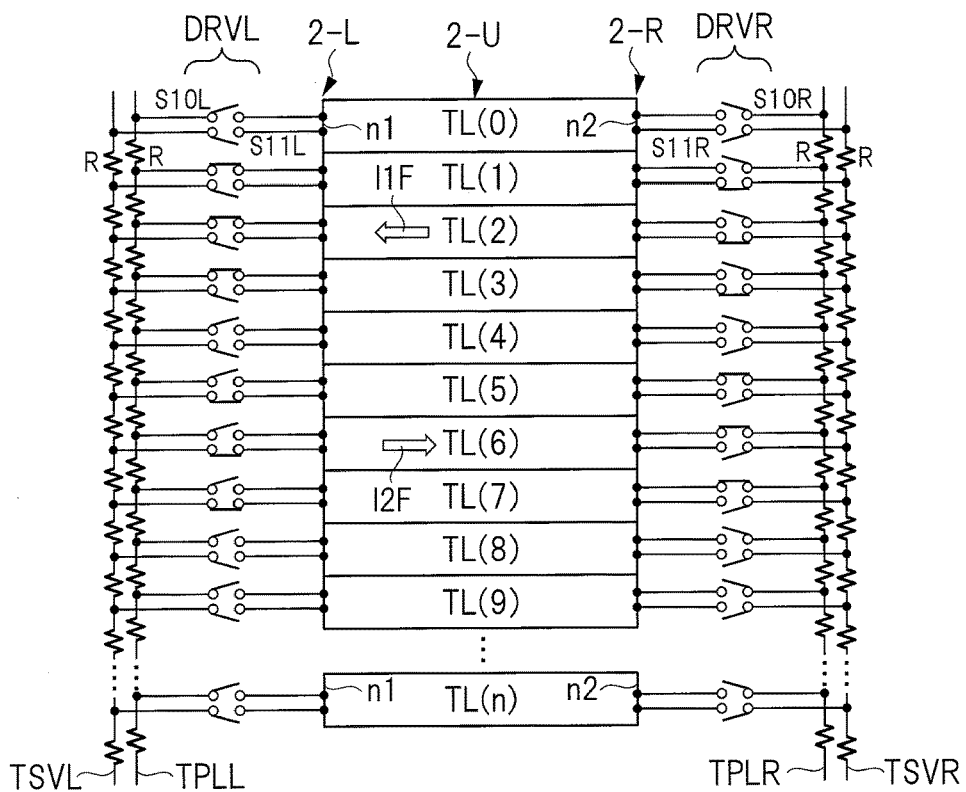
FIG. 7A and FIG. 7B are plan views each showing configurations of a drive circuit and a drive electrode.
Figure 7B:
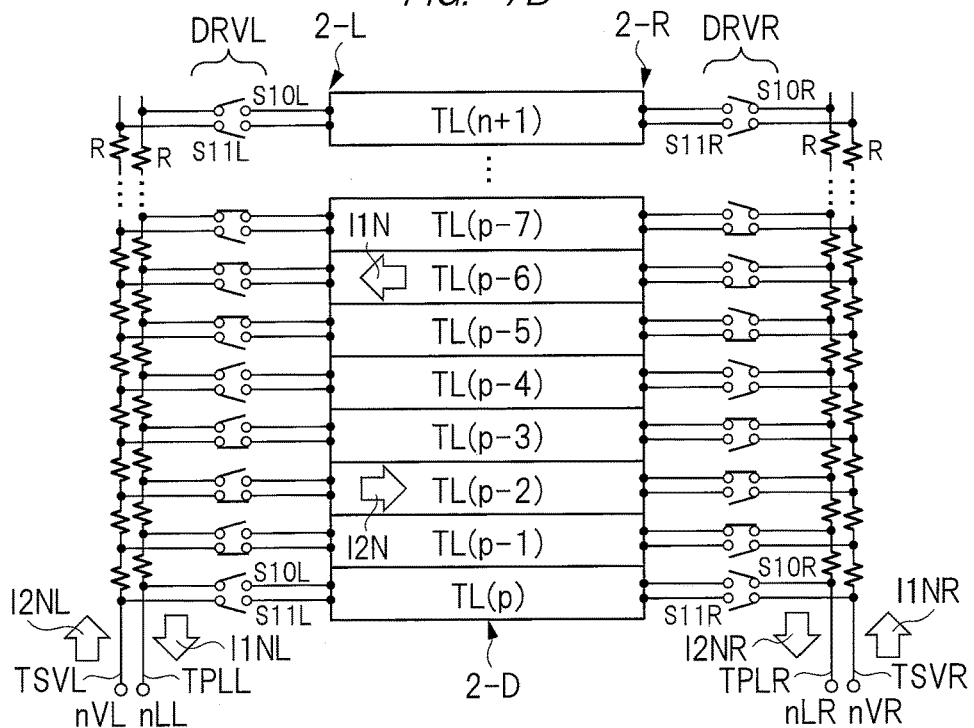

FIG. 7 is a plan view showing a configuration of the drive circuits DRVL and DRVR and the drive electrodes in which the plurality of first and second switches have the same size as each other. In order to avoid the complicated drawing, the plurality of drive electrodes TL(0) to TL(p) arranged in parallel to one another in the vertical direction are separately shown in FIGS. 7A and 7B between the side 2-U and the side 2-D in the display region 2. In the drawings, the drive electrodes TL(0) to TL(n) which are close to the side 2-U are shown in FIG. 7A, and the drive electrodes TL(n+1) to TL(p) which are close to the side 2-D are shown in FIG. 7B. When a configuration of the drive circuit and the drive electrode shown in FIG. 7A is arranged above a configuration of the drive circuit and the drive electrode shown in FIG. 7B, a plan view of the drive electrodes TL(0) to TL(p) is completed.

In FIGS. 7A and 7B, a switch connected between the signal line TPLL and the one end n1 of each of the drive electrodes TL(0) to TL(p) corresponds to a first switch S10L configuring the drive circuit DRVL. And, a switch connected between the signal line TSVL and the one end n1 of each of the drive electrodes TL(0) to TL(p) corresponds to a second switch S11L configuring the drive circuit DRVL. Similarly, in FIGS. 7A and 7B, a switch connected between the signal line TPLR and the other end n2 of each of the drive electrodes TL(0) to TL(p) corresponds to a first switch S10R configuring the drive circuit DRVR. And, a switch connected between the signal line TSVR and the other end n2 of each of the drive electrodes TL(0) to TL(p) corresponds to a second switch S11R configuring the drive circuit DRVR. In FIGS. 7A and 7B, note that reference characters S10L, S11L, S10R and S11R are attached to only some of the first switches and the second switches.

In the present specification, when the signal line TSVL is referred to as third signal line and the signal line TPLR is referred to as fourth signal line, the second switch S11L connected to the signal line TSVL is referred to as third switch, and the first switch S10R connected to the signal line TPLR is referred to as fourth switch in some cases. As shown in FIGS. 7A and 7B, the signal lines TSVL and TPLL extend along the array direction of the one (or the other) end n1 of each of the drive electrodes TL(0) to TL(p), that is, along the side 2-L of the display region 2, and the signal lines TSVR and TPLR extend along the array direction of the other (or the one) end n2 of each of the drive electrodes TL(0) to TL(p), that is, along the side 2-R of the display region 2.

In FIGS. 7A and 7B, reference characters nVL and nVR indicate ends of the signal lines TSVL and TSVR, the ends being connected to the driving signal circuit 6, and reference characters nLL and nLR indicate ends of the signal lines TPLL and TPLR, the ends being connected to the driving signal circuit 6. That is, tips of these ends are connected to the driving signal circuit 6 shown in FIG. 4. In the magnetic field generation period, from the driving signal circuit 6, the control device 3 supplies the driving signal TSV having the second voltage Vd to the respective ends nVL and nVR of the signal lines TSVL and TSVR, and supplies the driving signal TPL having the first voltage Vs to the respective ends nLL and nLR of the signal lines TPLL and TPLR.

FIG. 7A shows a state of the first switches S10L and S10R and the second switches S11L and S11R obtained when the magnetic field is generated in a region of the drive electrode TL(4) which is closer to the side 2-U. On the other hand, FIG. 7B shows a state of the first switches S10L and S10R and the second switches S11L and S11R obtained when the magnetic field is generated in a region of the drive electrode TL(p-4) which is closer to the side 2-D.

In FIG. 7, with a resistance R attached on each of the signal lines TSVL, TSVR, TPLL, and TPLR, a resistance component caused in each signal line is indicated as a distributed-constant behaving resistance. In order to avoid the complicated drawing, note that a reference character R is attached to only some of resistances.

As shown in FIG. 7A, when the magnetic field is generated in the region of the drive electrode TL(4), the first switch S10L and the second switch S11R respectively connected to the ends n1 and n2 of each of the drive electrodes TL(1) to TL(3) are turned on, and the second switch S11L and the first switch S10R respectively connected to the ends n1 and n2 of each of the drive electrodes TL(5) to TL(7) are turned on. Thus, a current I1F in a direction as exemplified in the drive electrode TL(2) flows through the drive electrodes TL(1) to TL(3), and a current I2F in a direction as exemplified in the drive electrode TL(6) flows through the drive electrodes TL(5) to TL(7). Therefore, the magnetic field is centrally generated in the region of the drive electrode TL(4). At this time, the drive electrode TL(4) is not connected to the signal lines TSVL, TSVR, TPLL, and TPLR, and is in a floating state.

Similarly, as shown in FIG. 7B, when the magnetic field is generated in the region of the drive electrode TL(p-4), the first switch S10L and the second switch S11R respectively connected to the ends n1 and n2 of each of the drive electrodes TL(p−7) to TL(p−5) are turned on, and the second switch S11L and the first switch S10R respectively connected to the ends n1 and n2 of each of the drive electrodes TL(p−3) to TL(p−1) are turned on. Thus, a current I1N in a direction as exemplified in the drive electrode TL(p−6) flows through the drive electrodes TL(p−7) to TL(p−5), and a current I2N in a direction as exemplified in the drive electrode TL(p−2) flows through the drive electrodes TL(p−3) to TL(p−1). Therefore, the magnetic field is centrally generated in the region of the drive electrode TL(p−4). At this time, the drive electrode TL(p−4) is not connected to the signal lines TSVL, TSVR, TPLL, and TPLR, either, and is in a floating state.

When the magnetic field is generated in the region of the drive electrode TL(p−4), the drive electrodes TL(p−7) to TL(p−5) and TL(p−3) to TL(p−1) are in close in a plan view to the ends nLL, nLR, nVL, and nVR of the signal lines TPLL, TPLR, TSVL, and TSVR to which the driving signal TPL or TSV is supplied, the ends being connected to the driving signal circuit 6. Therefore, the resistance R connected between each of the ends n1 and n2 of the drive electrodes and the end of the signal line is reduced. Thus, in the magnetic field generation period, a current having almost the same value as each of those of the currents I1NL, I1NR, I2NL, and I2NR respectively flowing through the ends nLL, nLR, nVL, and nVR flows through the drive electrodes as currents I1N and I2N. On the other hand, when the magnetic field is generated in the region of the drive electrode TL(4), the drive electrodes TL(1) to TL(3) and TL(5) to TL(7) are far in a plan view from the ends nLL, nLR, nVL, and nVR of the signal lines, the ends being connected to the driving signal circuit 6. Therefore, the resistance R connected between each of the ends n1 and n2 of the drive electrodes and the end of the signal line is large. Thus, in the magnetic field generation period, a current having a smaller value than each of those of the currents I1NL, I1NR, I2NL, and I2NR respectively flowing through the ends nLL, nLR, nVL, and nVR flows through these drive electrodes as currents I1F and I2F.

A current flowing through each of the drive electrodes TL(1) to TL(3) and TL(5) to TL(7) becomes smaller than a current flowing through each of the drive electrodes TL(p−7) to TL(P−5) and TL(p−3) to TL(p−1). Therefore, the magnetic field generated by each of the drive electrodes TL(1) to TL(3) and TL(5) to TL(7) becomes weaker than the magnetic field generated by each of the drive electrodes TL(p−7) to TL(p−5) and TL(p−3) to TL(p−1). As a result, the magnetic field generated in the region of the drive electrode TL(4) becomes weaker than the magnetic field generated in the region of the drive electrode TL(p−4). That is, the magnetic field generated by the drive electrode arranged at a position which is far in a plan view from the ends nLL, nLR, nVL, and nVR connected to the driving signal circuit 6 becomes weaker than the magnetic field generated by the drive electrode arranged at a position which is close to the ends nLL, nLR, nVL, and nVR. In other words, the magnetic field generated by the drive electrode arranged at a position which is far in a plan view from the ends nLL, nLR, nVL, and nVR connected to the driving signal circuit 6 becomes weaker than the magnetic field generated by the drive electrode arranged at a position which is close to the ends nLL, nLR, nVL, and nVR.

Figure 8:
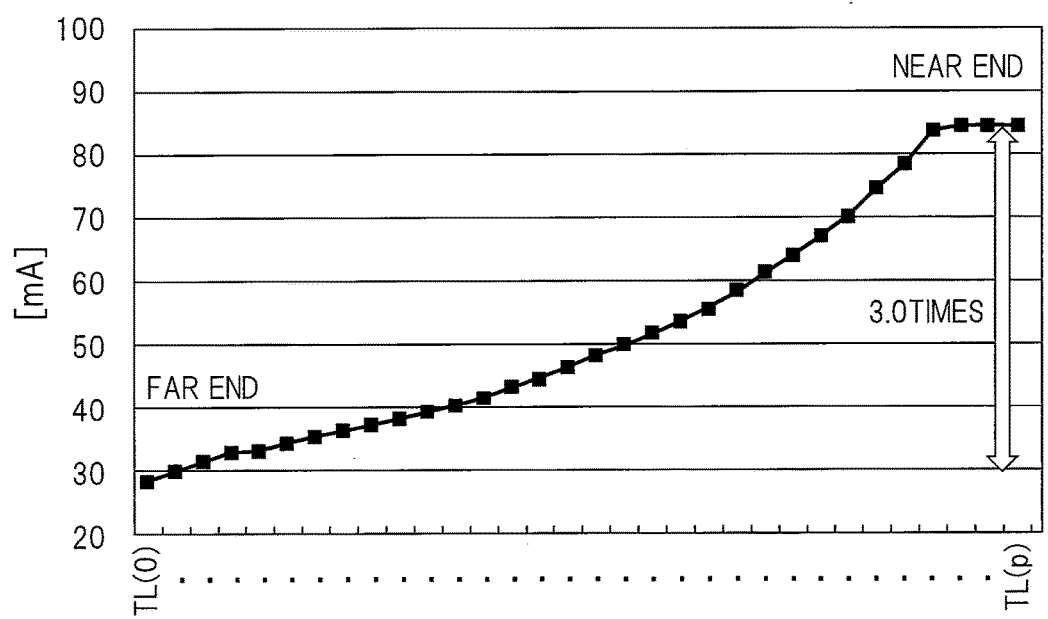
FIG. 8 is a property diagram showing a current flowing through the drive electrode in the magnetic field generation period.

FIG. 8 is a property diagram showing a value of the current flowing through the drive electrode in the magnetic field generation period. FIG. 8 is a property diagram created by the present inventor's measurement. In FIG. 8, a horizontal axis indicates a position of the drive electrode, and a "near end" indicates the drive electrode TL(p) arranged to be close to the ends nLL, nLR, nVL, and nVR to which the driving signal TPL or TSV is supplied, and a "far end" indicates the drive electrode TL(0) arranged to be far from the ends nLL, nLR, nVL, and nVR. The drive electrodes TL(p) to TL(0) are arranged to be farther from the ends of the signal lines in an order from the drive electrodes TL(p) to TL(0). A vertical axis in FIG. 8 indicates a value of the current flowing through the drive electrode. As understood from FIG. 8, in the magnetic field generation period, a value of the current flowing through the drive electrode is smaller as the drive electrode is closer to the far end. In a result of the measurement by the present inventor, the value of the current flowing through the drive electrode at the near end is about three times the value of the current flowing through the drive electrode at the far end.

As the value of the current flowing through the drive electrode closer to the far end becomes smaller, the magnetic field closer to the far end also becomes weaker. Thus, in the magnetic field generation period, an amount of electric charge stored in the capacitive element in the pen Pen varies depending on the touched position. As a result, in the magnetic-field detection period, an amount of the change detected by the magnetic-field detection coil also varies. Therefore, the detection sensitivity varies depending on the position. For example, it is expected that the variation in the detection sensitivity can be reduced and be constant to the position by adjustment of the received detection signals Rx(0) to Rx(p) in the touch control device 5 shown in FIG. 4. However, as shown in FIG. 8, when the currents respectively flowing through the drive electrodes are different from one another by three times, the variation in the generated magnetic field is larger than an original value. Therefore, such adjustment to have the constant detection sensitivity is not so easy.

Figure 9A:
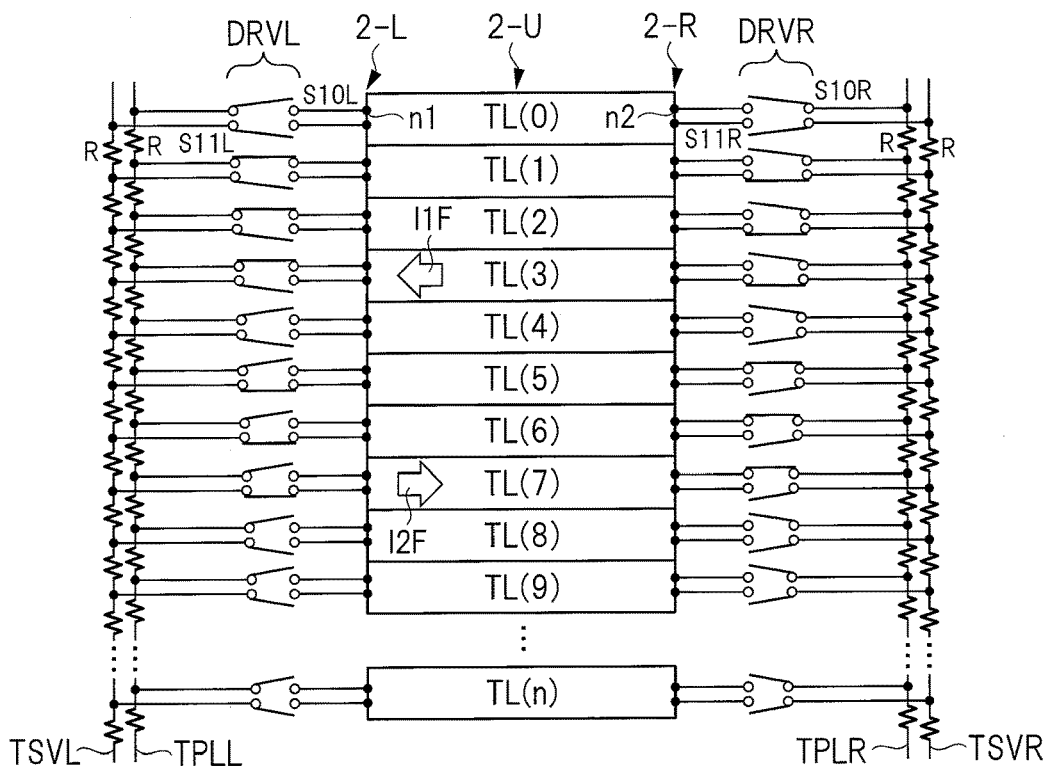
FIG. 9A and FIG. 9B are plan views each showing configurations of a drive circuit and a drive electrode according to the first embodiment.
Figure 9B:
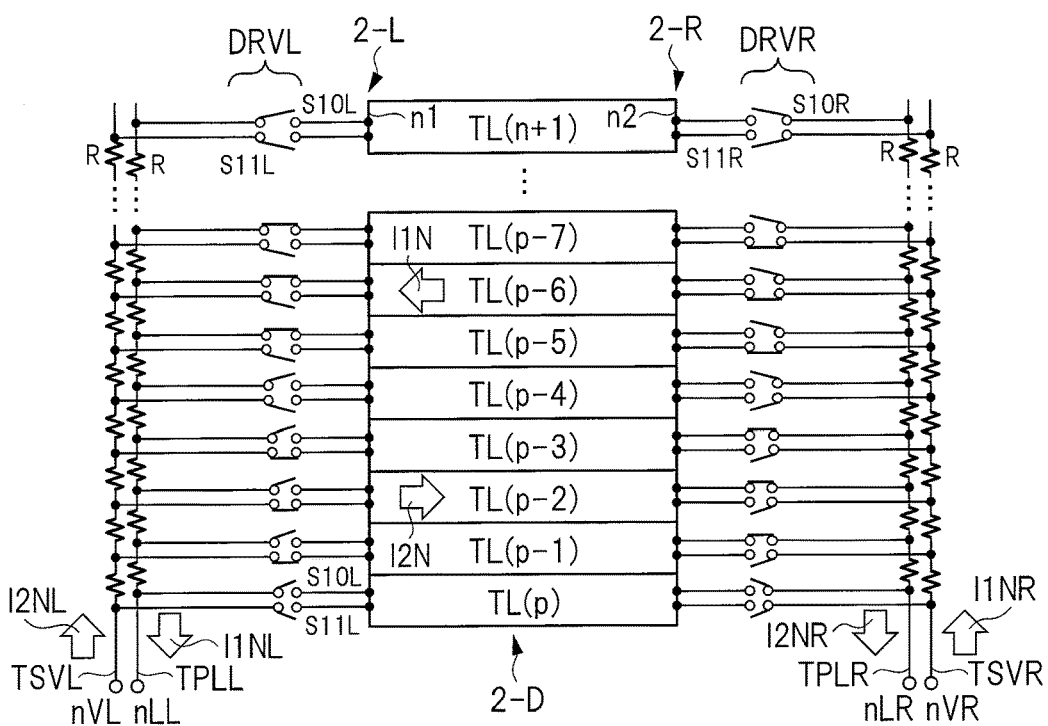

FIGS. 9A and 9B are plan views each showing a configuration of the drive circuits DRVL and DRVR and the drive electrodes according to the first embodiment. In order to avoid the complicated drawing, FIG. 9A shows the drive electrodes TL(0) to TL(n) arranged to be far in a plan view from respective ends nLL, nLR, nVL, and nVR of the signal lines TPLL, TPLR, TSVL, and TSVR to which a driving signal TPL or TSV is supplied and shows the corresponding drive circuits as similar to FIG. 7. FIG. 9B shows the drive electrodes TL(n+1) to TL(p) arranged to be close in a plan view to the respective ends nLL, nLR, nVL, and nVR of the signal lines TPLL, TPLR, TSVL, and TSVR and shows the corresponding drive circuits. When FIG. 9A is arranged above FIG. 9B, a plan view of the drive electrodes TL(0) to TL(p) arranged in parallel to one another in the vertical direction between the side 2-U and the side 2-D of the display region 2 and the drive circuits DRVL and DRVR corresponding thereto is completed. Note that the completed plan view is drawn to match a practical arrangement.

As similar to FIG. 7B, FIG. 9A shows a state in which the first switch S10L and the second switch S11R connected to the drive electrodes TL(1) to TL(3) are turned on and the second switch S11L and the first switch S10R connected to the drive electrodes TL(5) to TL(7) are turned on so that the magnetic field is generated in the region of the drive electrode TL(4). And, as similar to FIG. 7B, FIG. 9B shows a state in which the first switch S10L and the second switch S11R connected to the drive electrodes TL(p−7) to TL(p−5) are turned on and the second switch S11L and the first switch S10R connected to the drive electrodes TL(p−3) to TL(p−1) are turned on so that the magnetic field is generated in the region of the drive electrode TL(p−4).

In the first embodiment, the first switch S10L and the second switch S11L configuring the drive circuit DRVL and the first switch S10R and the second switch S11R configuring the drive circuit DRVR are different from each other in a size depending on their positions connected to the signal lines TPLL, TPLR, TSVL and TSVR. When the first switch S10L configuring the drive circuit DRVL is described as an example, the respective sizes of the first switches are reduced in an order from the first switch connected to a position which is far from the end nLL of the signal line TPLL to the first switch connected to a position which is close to the end nLL in a plan view. Similarly, in each of the signal lines TSVL, TPLR, and TSVR connected to the second switch S11L configuring the drive circuit DRVL and the first switch S10R and the second switch S11R configuring the drive circuit DRVR, the size of the switch is smaller as the switch is closer to the end nVL, nLR, or nVR.

In FIGS. 9A and 9B, note that the size of each of the first switch and the second switch is conceptually indicated by a distance between blank circles indicating the switch. That is, the larger the size of the switch becomes, the larger the distance between the blank circles in the switch reference character becomes. Thus, by the distance between the blank circles in the reference character indicating the switch, it is cleared in FIG. 9 that each size of the first and second switches is smaller as each of the first and second switches is closer to the end nLL, nVL, nLR or nVR in a plan view.

Figure 10A:
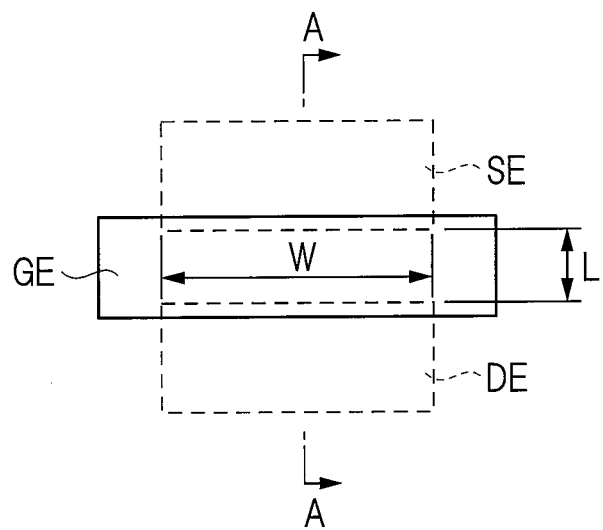
FIG. 10A and FIG. 10B are a plan view and a cross-sectional view each showing a configuration of a transistor according to the first embodiment.
Figure 10B:
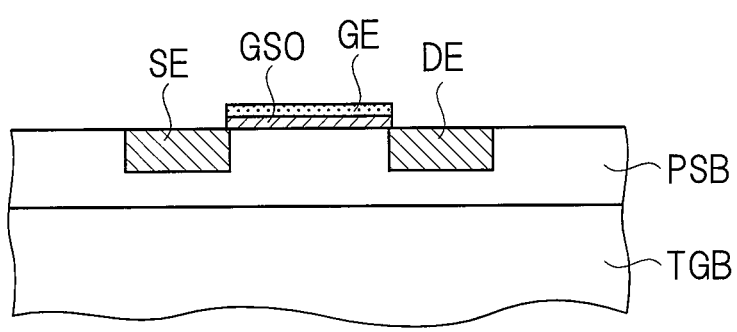

The first switches S10L and S10R and the second switches S11L and S11R are each composed of an insulated gate field effect transistor (hereinafter also referred to as a transistor) although not particularly limited in the first embodiment. FIGS. 10A and 10B are schematic views each showing a configuration of the transistor. FIG. 10A is a plan view of the transistor, and FIG. 10B is a cross-sectional view of the transistor.

As shown in FIG. 10B, the transistor includes N-type semiconductor regions SE and DE formed in a P-type semiconductor layer PSB formed in a first substrate TGB and a gate electrode GE formed on the P-type semiconductor layer PSB through a gate insulating film GSO. The N-type semiconductor region SE functions as a source of the transistor, and the N-type semiconductor region DE functions as a drain of the transistor. A selection signal from the above-described selection circuit SELL (or SELR) is supplied to the gate electrode GE of the transistor, the source SE (or drain DE) is connected to the signal line (e.g., TPLL), and the drain DE (or source SE) is connected to the end n1 (or n2) of the drive electrode.

In FIG. 10A, a cross section of a portion along a line A-A' has a cross section shown in FIG. 10B described above. In FIG. 10A, a reference character "L" is a channel length indicating a length between the source region SE and the drain region DE, and a reference character "W" is a channel width indicating a width between the source region SE and the drain region DE. In the first embodiment, by change in the channel width W, the size of the transistor is changed. That is, the size of the transistor is increased by expanding (widening) the channel width W of the transistor, and the size of the transistor is reduced by reducing (narrowing) the channel width W.

In the first embodiment, the size of each of the first switches S10L and S10R and the second switches S11L and S11R means the size of the transistor. Thus, in a plan view, the channel width of the transistor is smaller as the transistor is closer to the end nLL, nLR, nVL, or nVR of the signal lines TPLL, TPLR, TSVL, or TSVR.

For example, the transistor having a large (wide) channel width W configures the first switch S10L connected between the one end n1 of the drive electrode TL(1) shown in FIG. 9A and the signal line TPLL, and the transistor having a small (narrow) channel width W configures the first switch S10L connected between the one end n1 of the drive electrode TL(p-1) shown in FIG. 9B and the signal line TPLL. The transistor having a channel width W between the channel width W of the transistor configuring the first switch S10L connected to the drive electrode TL(p-1) and the channel width W of the transistor configuring the first switch S10L connected to the drive electrode T1(1) configures, for example, the first switch S10L connected between the one end n1 of the drive electrode TL(n) shown in FIG. 9A and the signal line TPLL.

When a transistor is turned on by a selection signal supplied to the gate electrode of the transistor, an on-resistance is changed in accordance with the channel width W of the transistor. That is, the on-resistance is large when the channel width W is small (narrow), and the on-resistance is small when the channel width W is large (wide).

In the magnetic field generation period, when the first switch S10L and the second switch S11R connected to each of the drive electrodes TL(1) to TL(3) are turned on as shown in FIG. 9A, the respective sizes of these first and the second switches are large and respective on-resistances thereof are small because these first and second switches are connected to positions which are farther than the first switch S10L and the second switch S11R connected to the drive electrodes TL(p-7) to TL(p-5) from the ends nLL and nVR of the signal lines TPLL and TSVR. As a result, a combined resistance between the one end n1 of each of the drive electrodes TL(1) to TL(3) and the end nLL of the signal line TPLL is small, and a combined resistance between the other end n2 of each of these drive electrodes and the end nVR of the signal line TSVR is also small.

Similarly, when the first switch S10R and the second switch S11L connected to each of the drive electrodes TL(5) to TL(7) are turned on, the respective sizes of these first and the second switches are large and respective on-resistances thereof are small because these first and second switches are connected to positions which are farther than the first switch S10R and the second switch S11L connected to the drive electrodes TL(p-3) to TL(p-1) from the ends nLR and nVL of the signal lines TPLR and TSVL. As a result, a combined resistance between the one end n1 of each of the drive electrodes TL(5) to TL(7) and the end nLR of the signal line TPLR becomes small, and a combined resistance between the other end n2 of each of these drive electrodes and the end nVL of the signal line TSVL also becomes small.

Thus, a current I1F flowing through the drive electrodes TL(1) to TL(3) and a current I2F flowing through the drive electrodes TL(5) to Tl(7) can be large.

On the other hand, in the magnetic field generation period, when the first switch S10L and the second switch S11R connected to each of the drive electrodes TL(p-7) to TL(p-5) are turned on as shown in FIG. 9B, the respective sizes of these first and the second switches are small and respective on-resistances thereof are large because these first and second switches are connected to be closer to the ends nLL and nVR of the signal lines TPLL and TSVR than the first switch S10L and the second switch S11R connected to the drive electrodes TL(1) to TL(3). As a result, a combined resistance between the one end n1 of each of the drive electrodes TL(p-7) to TL(p-5) and the end nLL of the signal line TPLL becomes large, and a combined resistance between the other end n2 of each of these drive electrodes and the end nVR of the signal line TSVR also becomes large.

Similarly, when the first switch S10R and the second switch S11L connected to each of the drive electrodes TL(p−3) to TL(p−1) are turned on, the respective sizes of these first and the second switches are small and respective on-resistances thereof are large because these first and second switches are connected to positions which are closer to the ends nLR and nVL of the signal lines TPLR and TSVL than the first switch S10R and the second switch S11L connected to the drive electrodes TL(5) to TL(70). As a result, a combined resistance between the one end n1 of each of the drive electrodes TL(p−3) to TL(p−1) and the end nLR of the signal line TPLR becomes large, and a combined resistance between the other end n2 of each of these drive electrodes and the end nVL of the signal line TSVL also becomes large.

Thus, a current I1N flowing through the drive electrodes TL(p−7) to TL(p−5) and a current I2N flowing through the drive electrodes TL(p−3) to TL(p−1) can be small.

That is, the size of each of the switches is adjusted so that the on-resistance of the switch connected to a location which is closer to the driving signal circuit 6 and which has a small resistance among the respective switches connected along the signal is larger and the on-resistance of the switch connected to a location which is farther from the driving signal circuit 6 and which has a large resistance is smaller.

As a result, an amount of a current supplied from the signal line becomes uniform among the drive electrodes arranged in any locations. Therefore, a difference in strength between a magnetic field generated in the drive electrode TL(4) arranged to be far from the ends nLL, nLR, nVL, and nVR and a magnetic field generated in the drive electrode TL(p−4) arranged to be closer to the ends nLL, nLR, nVL, and nVR in a plan view than the drive electrode TL(4) is reduced. Thus, in the magnetic field generation period, change in the detection sensitivity depending on a position of the drive electrode within the display region can be reduced.

The on-resistance of the switch can also be adjusted by the channel length of the transistor configuring the switch. When the channel length L of the transistor is large, the on-resistance of the switch becomes large. Therefore, if the respective channel widths W of the transistors are the same, the transistor having a large channel length L, i.e., having a small W/L value may be arranged at a near end of the driving signal circuit 6 having a small signal line resistance, and the transistor having a large W/L value may be arranged at a far end of the driving signal circuit 6 having a larger signal line resistance than that of a near end. In this case, the W/L value corresponds to the size of the switch. The switch connected to the signal line which is close to the driving signal circuit 6 may be smaller in size than the switch connected to the farther than the near end. Therefore, at this time, the channel width W may not be required to be constant, and the channel width W in addition to the channel length can be appropriately set to any value.

<Content of Combined Resistance in Magnetic Field Generation Period>

Figure 11:
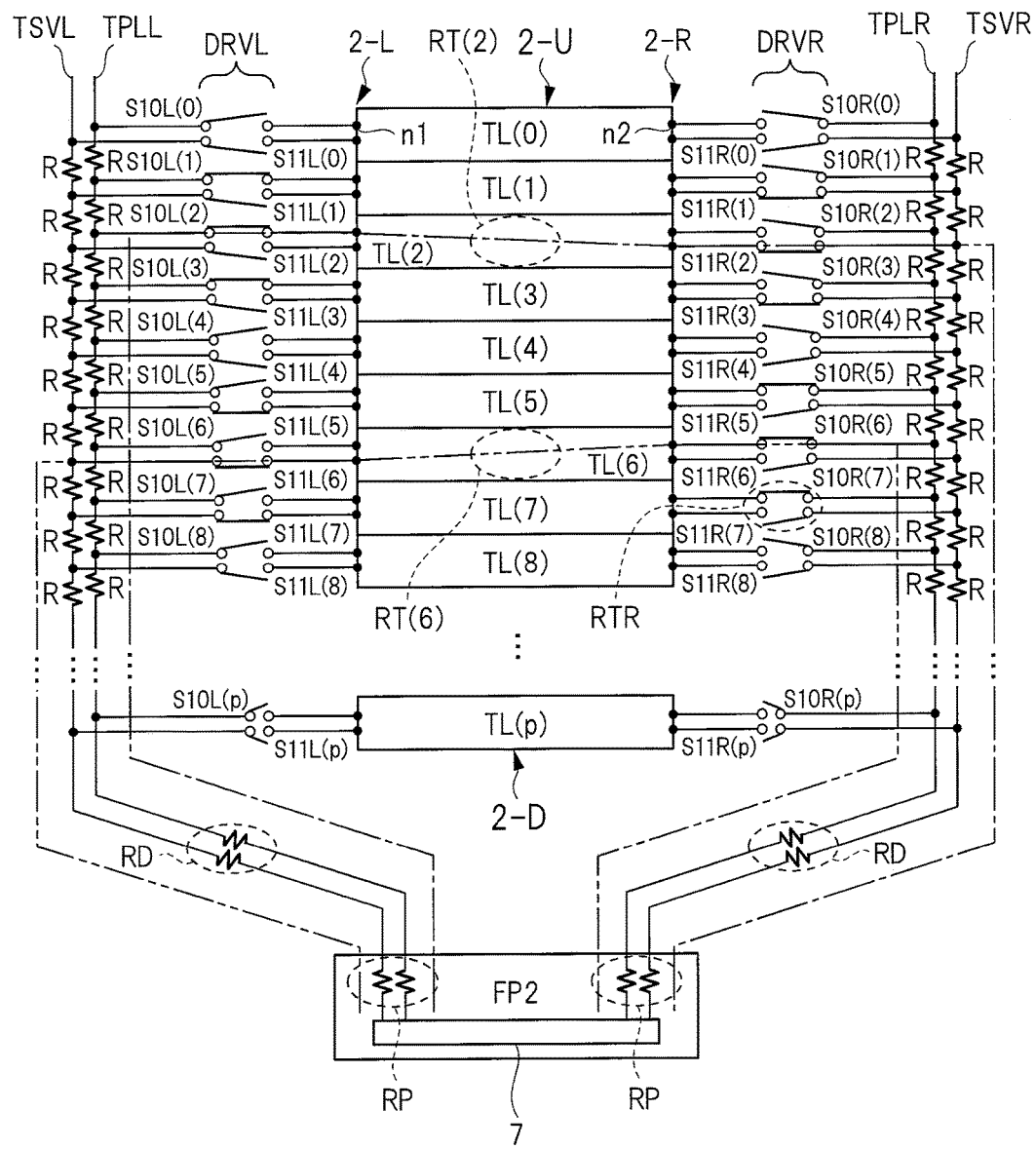
FIG. 11 is a plan view showing configurations of the drive circuit and the drive electrode according to the first embodiment.

Next, contents of a combined resistance including the selected drive electrode and switches in the magnetic field generation period will be described. FIG. 11 is a plan view showing a configuration of the drive circuits DRVL and DRVR and the drive electrodes according to the first embodiment. While FIG. 11 is similar to FIG. 9, the drive electrodes TL(n) to TL(p−1) shown in FIGS. 9A and 9B are omitted in FIG. 11. FIG. 11 is drawn to match an arrangement of the display module 500 shown in FIG. 5.

In FIG. 11, each of the ends nLL, nLR, nVL, and nVR of the signal lines TPLL, TPLR, TSVL, and TSVR is shown as a region of the flexible cable FB2. That is, FIG. 11 shows a case in which each of the driving signals TPL and TSV is formed by not the control device 3 but another circuit block described with reference to FIG. 5. Thus, as described with reference to FIG. 5, the signal lines TPLL, TPLR, TSVL, and TSVR are also formed in the portion (the broken line portion in FIG. 5) covered by the control device 3, and these signal lines are connected to the flexible cable FB2.

In FIG. 11, a power supply circuit 7 is used as the driving signal circuit 6 which forms the driving signals TPL and TSV. That is, a first voltage Vs and a second voltage Vd formed by the power supply circuit are supplied as the driving signals TPL and TSV to the signal lines TPLL, TPLR, TSVL, and TSVR shown in FIG. 11, respectively. The power supply circuit 7 is mounted on the flexible cable FB2 although not particularly limited.

Also in FIG. 11, as similar to FIG. 9, a first switch is connected between the signal line TPLL and each of the drive electrodes TL(0) to TL(p). In FIG. 11, a reference character of the first switch is indicated by a combination of a reference character indicating the first switch and a number of the connected drive electrode. For example, the first switch connected between the drive electrode TL(0) and the signal line TPLL is indicated as S10L(0) by combining a number (0) of the drive electrode and a reference character S10L indicating the first switch. The same goes for other first and second switches. The size of each of the first switch and the second switch is indicated by a distance between blank circles in the reference character of the switch as similar to FIG. 9. The respective sizes of the first switches and the second switches are gradually reduced in an order from the first switches S10L(0) and S10R(0) and the second switches S11L(0) and S11R(0) connected to be far from the flexible cable FB2 to the first switches S10L(p) and S10R(p) and the second switches S11L(p) and S11R(p) connected to be close to the flexible cable FB2 in a plan view.

In FIG. 11, the first switches S10L(1) to S10L(3) and S10R(5) to S10R(7) and the second switches S11R(1) to S11R(3) and S11L(5) and S11L(7) are turned on by the selection circuits SELL and SELR, so that the magnetic field is generated in the region of the drive electrode TL(4) as similar to FIG. 9A.

When the first switch and the second switch are turned on as described above, a plurality of current paths including the drive electrodes TL(1) to TL(3) and TL(5) to TL(7) are formed. In FIG. 11, as representatives, a current path including the drive electrode TL(2) is indicated by a one-dot and dash line RC(2), and a current path including the drive electrode TL(6) is indicated by a two-dot and dash line RC(6). The closer than the switches to the flexible cable FB2 the first switches and the second switches are, the smaller the size is so that the currents circulating once around the current paths formed in the magnetic field generation period are equal to one another without depending on the position. In other words, the respective on-resistances of the first switch and the second switch are adjusted so that the respective combined resistances of the current paths are equal to one another. For example, the respective sizes of the first switch S10L(2) and the second switch S11R(2) connected to the drive electrode TL(2) and the first switch S10R(6) and the second switch S11L(6) connected to the drive electrode TL(6) are adjusted so that the combined resistance for one circulation in the current path RC(2) and the combined resistance for one circulation in the current path RC(6) shown in FIG. 11 are equal to each other.

The resistance components contained in the combined resistance of the current path RC(2) become the resistance components R, RTR, RT(2), RD, and RP shown in FIG. 11. Similarly, the resistance components contained in the combined resistance of the current path RC(6) become the resistance components R, RTR, RT(6), RD, and RP. Here, the resistance components RT(2) and RT(6) each shown by a broken line indicate the resistances of the drive electrodes TL(2) and TL(6). That is, the resistance component indicates a resistance between the ends n1 and n2 of each of the drive electrodes. The resistance component RTR shown by a broken line indicates the on-resistance of the turned-on first switch or second switch.

The resistance component R and the resistance components RD and RP each indicated by a broken line will be described with reference to FIG. 5. First, the resistance component R is a resistance component shown as a distributed constant behavior of a resistance component in a portion of a signal line linearly extending in a vertical direction in a region between the side of the display region 2 and the long side of the display module 500 shown in FIG. 5. For example, a resistance in a portion of the signal line TPLL linearly extending in a vertical direction in a region between the side 2-L of the display region 2 and the long side 500-L of the display module 500 corresponds to the resistance component R. The same goes for the resistance component R shown on each of the other signal lines TPLR, TSVL, and TSVR.

The resistance component RD indicates a resistance component caused in a signal line connecting the flexible cable FB2 and a portion of a signal line linearly extending in the region between the side of the display region 2 and the long side of the display module 500. Also in this case, when the signal line TPLL is taken as an example, the resistance component RD indicates a resistance of a pull-out portion of the signal line TPLL connecting the flexible cable FB2 and a portion of the signal line TPLL linearly extending and in the region between the side 2-L of the display region 2 and the long side 500-L of the display module 500. The same goes for the resistance component RD shown on each of the other signal lines TPLR, TSVL, and TSVR.

The resistance component RP indicates a mounting resistance in mounting the flexible cable FB2 on the first substrate TGB and indicates an output impedance of the power supply circuit. That is, the resistance component RP includes a power supply impedance having the first voltage and a power supply impedance having the second voltage Vd which are formed by the power supply circuit.

Figure 12:
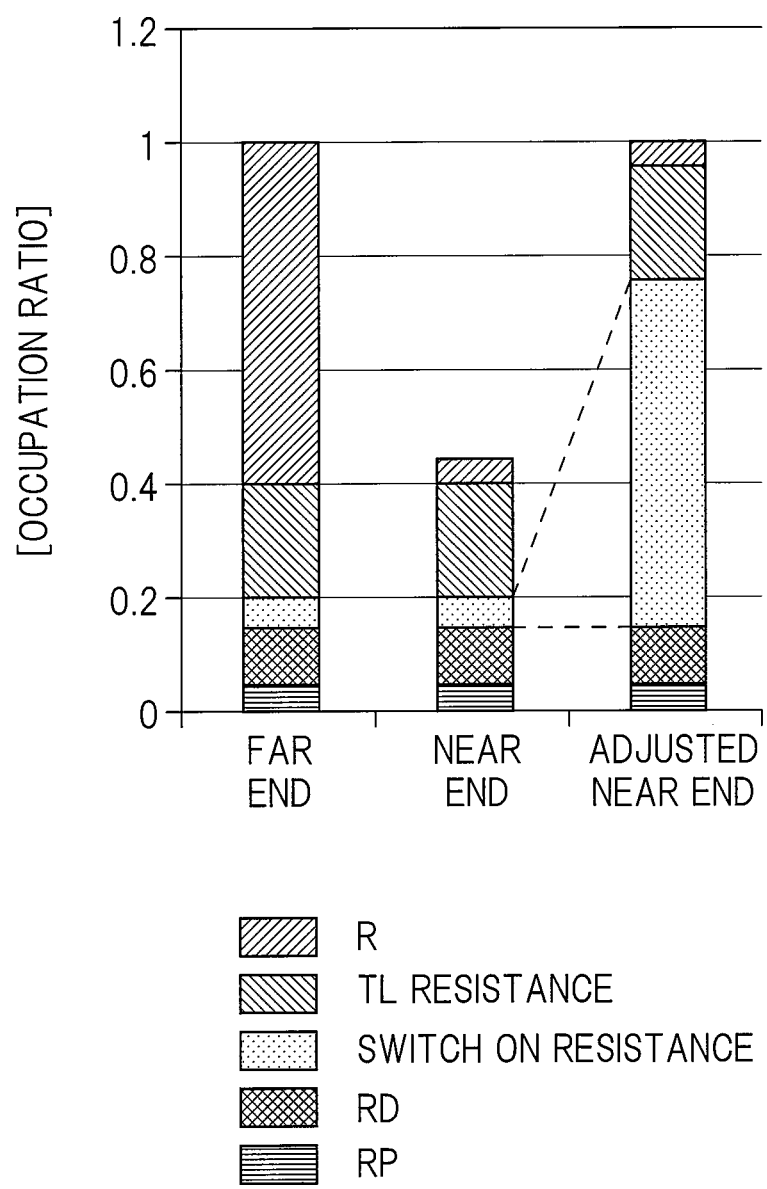
FIG. 12 is a diagram showing contents of a combined resistance of a current path according to the first embodiment.

FIG. 12 is a diagram showing contents of a combined resistance included in a current path. In this drawing, contents of respective combined resistances of a current path formed at a far end and a current path formed at a near end are shown. Here, as the current path formed at the near end, the drawing shows a current path including a drive electrode to which driving signals (having the first voltage Vs and the second voltage Vd) are supplied by the first switch and the second switch connected to be close to the flexible cable FB2. As the current path formed at the near end, FIG. 12 shows two types of current paths at a near end and an adjusted near end. FIG. 12 shows a case in which the current path shown as the item "near end" as described with reference to FIG. 7 has the respective sizes of the first switch and the second switch which are equal to each other, and in which the current path shown as the item "adjusted near end" has the respective sizes of the first switch and the second switch which are reduced in an order from the far end to the near end.

In FIG. 12, the contents of the resistance component are indicated by a length of a bar in assuming that the combined resistance of the current path formed at the far end is "1". In the bar shown in FIG. 12, a portion filled with positive slope lines indicates a combined value of the resistance R, a portion filled with negative slope lines indicates a resistance component (a TL resistance in FIG. 12) of the drive electrode. In the bar, a portion filled with dots indicates an on-resistance RTR (a switch on-resistance in FIG. 12) of the first switch or the second switch, a portion filled with rhombi indicates a resistance component RD of the pull-out portion, and a portion filled with horizontal lines indicates a resistance component RP of a mounting resistance and a power supply impedance.

As shown in FIG. 12, in comparison from the current path formed at the near end to the current path formed at the far end that is farther than the near end from the flexible cable FB2, the current paths are almost the same as one another in occupation ratios of the resistance component (TL resistance) of the drive electrode, the on-resistance (switch on-resistance) of the first switch or the second switch, the resistance component RD (the portion filled with rhombi) of the pull-out portion, and the resistance component RP (the portion filled with horizontal lines) of the mounting resistance/power supply impedance. On the other hand, the resistance component R of the portion arranged along the sides 2-L and 2-R of the display region 2 is smaller in the current path formed at the near end than at the far end. In the first embodiment, the respective sizes of the first switch and the second switch included in the current path formed at the near end are made small, and the respective on-resistances thereof are made large. In this manner, as shown as the item "adjusted near end", the on-resistances (portions filled with the dots) of the first switch and the second switch are made large, so that the occupation ratios of the on-resistances of the first switch and the second switch are made large. As a result, the combined resistance can be substantially the same between the current path formed at the near end and the current path formed at the far end.

In the magnetic field generation period, when the respective combined resistances of the current path formed at the near end and the current path formed at the far end that is farther than the near end from the flexible cable FB2 are made substantially the same as each other, currents having the same value as each other can flow through the current paths. As a result, change in the detection sensitivity depending on the position can be reduced. When FIG. 11 is taken as an example, currents respectively flowing through the current path RT(2) and RT(6) can be made substantially the same in the magnetic field generation period. As a result, the strength of the magnetic field generated by the bundle drive electrode configured by the drive electrodes TL(1) to TL(3) and the strength of the magnetic field generated by the bundle drive electrode configured by the drive electrodes TL(5) to TL(7) can be made substantially the same as each other.

Second Embodiment

A second embodiment provides a configuration appropriate for both magnetic field touch detection and electric field touch detection.

A display apparatus according to the present invention can perform the magnetic field touch detection and the electric field touch detection in a time-divisional manner using a drive electrode arranged in a display region as an electrode for magnetic field generation or an electrode for electric field generation. However, a generation principle is different between the magnetic field and the electric field as described above, and a drive method in the display apparatus is also different therebetween. Therefore, it is required to design a switch size appropriate for both the magnetic field touch detection and the electric field touch detection.

This issue will be described with reference to a schematic view of a liquid crystal module in the electric field touch detection shown in FIG. 13.

In the electric field touch detection, among a plurality of second switches S11L and S11R arranged along signal lines TSVL and TSVR, the second switches S11L and S11R respectively connected to one end and the other end of a selected drive electrode are turned on. At this time, a driving signal TSV whose voltage periodically changes is supplied to each of the signal lines TSVL and TSVR. Thus, in the electric field touch detection, the driving signals TSV are respectively supplied as electric field driving signals from the signal lines TSVL and TSVR to both the ends of the selected drive electrode via the second switches.

Figure 13:
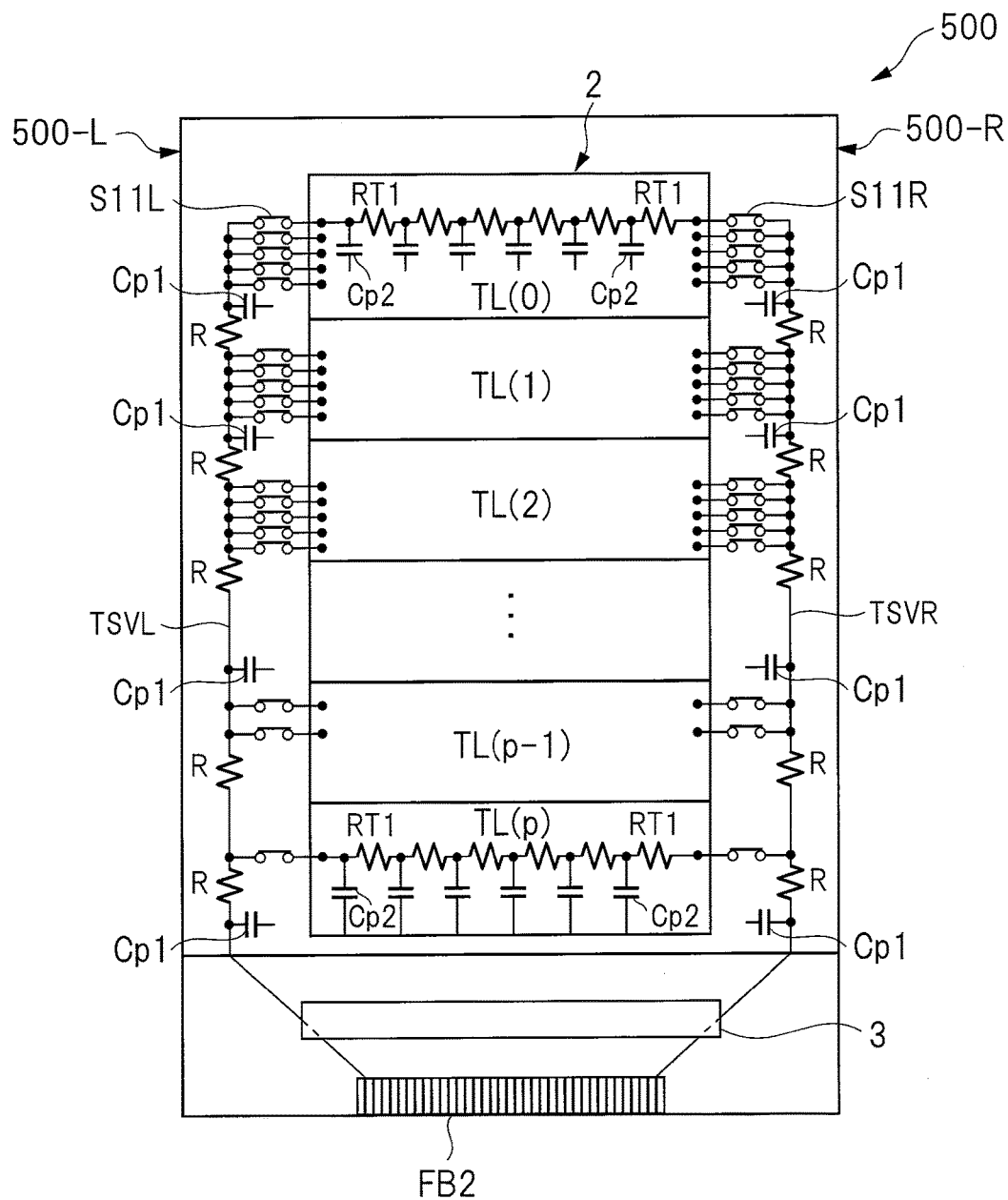
FIG. 13 is a diagram for explaining a new task.

In FIG. 13, only the second switches arranged on the uppermost side are denoted with reference characters S11L and S11R, and respective reference characters of other second switches are omitted. FIG. 13 shows each switch size using the number of the second switches S11L and S11R connected to one drive electrode. That is, the larger the number of the connected switches is, the larger the sizes of the second switches S11L and S11R are. In FIG. 13, a reference character R is a distributed-constant behaving resistance component of the resistances of the signal lines TSVL and TSVR, and a reference character Cp1 is a distributed-constant behaving capacitance of the capacitances of the signal lines TSVL and TSVR. Further, a reference character RT1 is a distributed-constant behaving resistance component of the resistances of the drive electrodes TL(0) to TL(p), and a reference character Cp2 is a distributed-constant behaving capacitance of the capacitances of the drive electrodes TL(0) to TL(p). Note that FIG. 13 shows all the second switches connected to the drive electrodes TL(0) to TL(2) and TL(p−1) to TL(p) to be turned on. However, in the electric field touch detection period, one drive electrode is connected to the signal lines TSVL and TSVR to generate the electric field.

In FIG. 13, as described in the first embodiment, a size of a second switch connected to a drive electrode close to an end of a signal line connected to a driving signal circuit 6 is small, and a size of a second switch connected to a driver electrode farther than the close drive electrode from the end of the signal line connected to the driving signal circuit 6 is large. In the electric field touch detection, the electric field driving signal TSV is supplied to the drive electrode arranged to be close to the end of the signal line via the second switch having an on-resistance larger than an on-resistance of the drive electrode arranged to be farther than the close drive electrode from the end. A size (e.g., a channel length L shown in FIG. 10) of a transistor configuring the second switch is sufficiently smaller than a length of the drive electrode. Therefore, the on-resistance of the second switch acts as a lumped-constant resistance component with respect to the capacitance (a combined value of the distributed-constant behaving capacitance component Cp2) of the drive electrode. Thus, a signal change in the drive electrode arranged to be close to the end of the signal line more slows down and more deteriorates than a signal change in the drive electrode arranged to be farther than the close drive electrode from the end.

As shown in FIGS. 9 and 11, in the magnetic field touch detection, a plurality of drive electrodes are simultaneously driven as a bundle in order to enhance the strength of the magnetic field generated in the magnetic field generation period. Also in the electric field touch detection, a plurality of drive electrodes can also be driven as a bundle. However, the number of the bundled drive electrodes is not limited to the same number as in the magnetic field touch detection, and it is expected that a larger or smaller number of drive electrodes than that in the magnetic field touch detection can be driven. And, from the viewpoint of touch detection resolution, it is expected that the drive electrodes can be driven so as not to be bundled but to be one by one.

In the magnetic field touch detection shown in FIGS. 9 and 11, for example, the same touch detection resolution as that when a magnetic field is generated in a region of one drive electrode (e.g., TL(4)) is equivalent to a touch detection resolution when one drive electrode is driven in the electric field touch detection.

However, when the plurality of drive electrodes are bundled, i.e., when the adjacent second switches are simultaneously connected to each other, the on-resistance of the second switch is reduced depending on the number of the bundled drive electrodes. Therefore, when the size of the second switch close to the end of the signal line connected to the driving signal circuit 6 is reduced in accordance with the number of the bundled drive electrodes in the magnetic field touch detection, a resistance in the electric field touch detection caused when a smaller number of drive electrodes close to the end than the number in the magnetic field touch detection is driven becomes high, so that a touch detection performance deteriorates in some cases. Within the display region, the detection sensitivity in the electric field touch detection may be not uniform.

<Contents of Combined Resistance in Magnetic Field Touch Detection and Electric Field Touch Detection>

Figure 14:
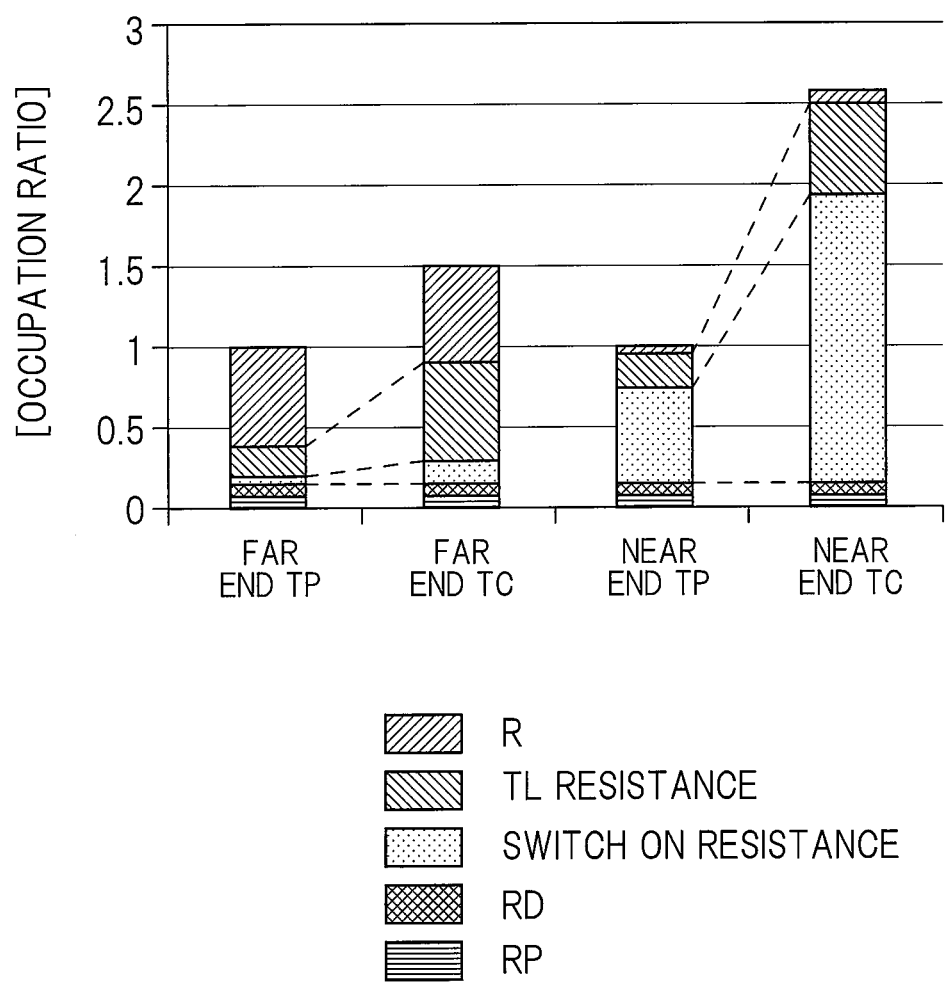
FIG. 14 is a diagram showing contents of a combined resistance of a path formed in each of magnetic-field touch detection and electric-field touch detection.

FIG. 14 is a diagram showing contents of a combined resistance of a current path formed in the magnetic field generation period for the magnetic field touch detection and contents of a combined resistance of a path formed in the electric field touch detection. FIG. 14 shows the contents of the combined resistance by the length of the bar as similar to FIG. 12. In FIG. 14, an item "far end TP" and an item "near end TP" shown on a horizontal axis indicate combined resistances of current paths formed at a far end of the signal lines TSVL and TSVR in the magnetic field generation period when viewed from an output terminal of the power supply circuit and combined resistances of current paths formed at a near end closer than the far end to the output terminal of the power supply circuit, and have the same values as those in FIG. 12. On the horizontal axis shown in FIG. 14, the far end TC indicates a combined resistance of a path formed when the second switches S11L and S11R connected to be far from ends of the signal lines TSVL and TSVR (the output end of the power supply circuit) are turned on in the electric field touch detection. And, the near end TC indicates a combined resistance of a path formed when the second switches S11L and S11R connected to be closer to the ends of the signal lines TSVL and TSVR than the near end TC are turned on in the electric field touch detection.

The far end TC indicates a combined resistance of a path formed when the second switches S11L and S11R connected between, for example, the drive electrode TL(0) shown in FIG. 13 and the signal lines TSVL and TSVR are turned on.

This path in this case includes a path in which the signal line TSVL, the second switch S11L, the drive electrode TL(0), the second switch S11R, and the signal line TSVR shown in FIG. 13 are connected in series. And, the near end TC indicates a combined resistance of a path formed when the second switches S11L and S11R connected between, for example, the drive electrode TL(p) shown in FIG. 13 and the signal lines TSVL and TSVR are turned on. This path in this case includes a path in which the signal line TSVL, the second switch S11L, the drive electrode TL(p), the second switch S11R, and the signal line TSVR shown in FIG. 13 are connected in series.

When the far end TP and the far end TC are compared to each other in FIG. 14, the far end TC has the large occupation ratios in the TL resistance and the switch-on resistance. Therefore, the far end TC is larger than the far end TP in the combined resistance. While the plurality of the drive electrodes are bundled and connected to the signal line at the far end TP in the magnetic field generation period, one drive electrode is connected to the signal line at the far end TC. Therefore, there is a difference as shown in FIG. 14. Also when the near end TP and the near end TC are compared with each other, the near end TC has the large occupation ratios in the TL resistance and the switch-on resistance, and therefore, the near end TC has the larger combined resistance than that of the near end TP because of the above-described same reason.

When the far end TC and the near end TC are compared with each other, the respective sizes of the second switches S11L and S11R are adjusted so that the respective sizes are small in an order from the size at the connecting position far from the flexible cable FB2 to the size at the connecting position close thereto so that the respective on-resistances of the second switches S11L and S11R are large. Therefore, the occupation ratio of the switch-on resistance becomes large, and the combined resistance of the near end TC becomes larger than the combined resistance of the far end TC. Since the drive electrodes are not bundled in the electric field touch detection, the far end TC has a resistance value which is three times a resistance value of the far end TP.

When the respective sizes of the first switches and the second switches are adjusted so that the respective on-resistances are large in an order from the connection position which is far from the flexible cable FB2 (or the end of the signal line) to the connection position which is closer to the flexible cable FB2 than the far connection position in accordance with the detection sensitivity in the magnetic field touch detection, the detection sensitivity in the electric field touch detection is not uniform depending on a location of the drive electrode within the display region 2.

<Configuration of Drive Circuits DRVL and DRVR>

Figure 15A:
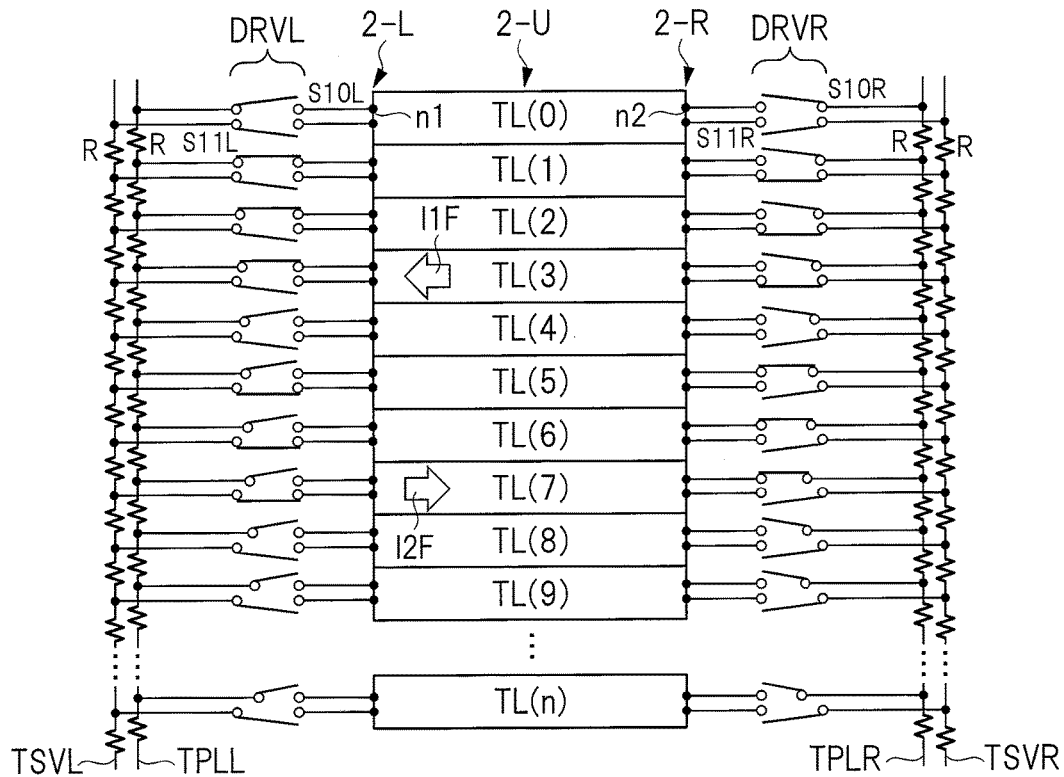
FIG. 15A and FIG. 15B are plan views showing configurations of a drive circuit and a drive electrode according to a second embodiment.
Figure 15B:
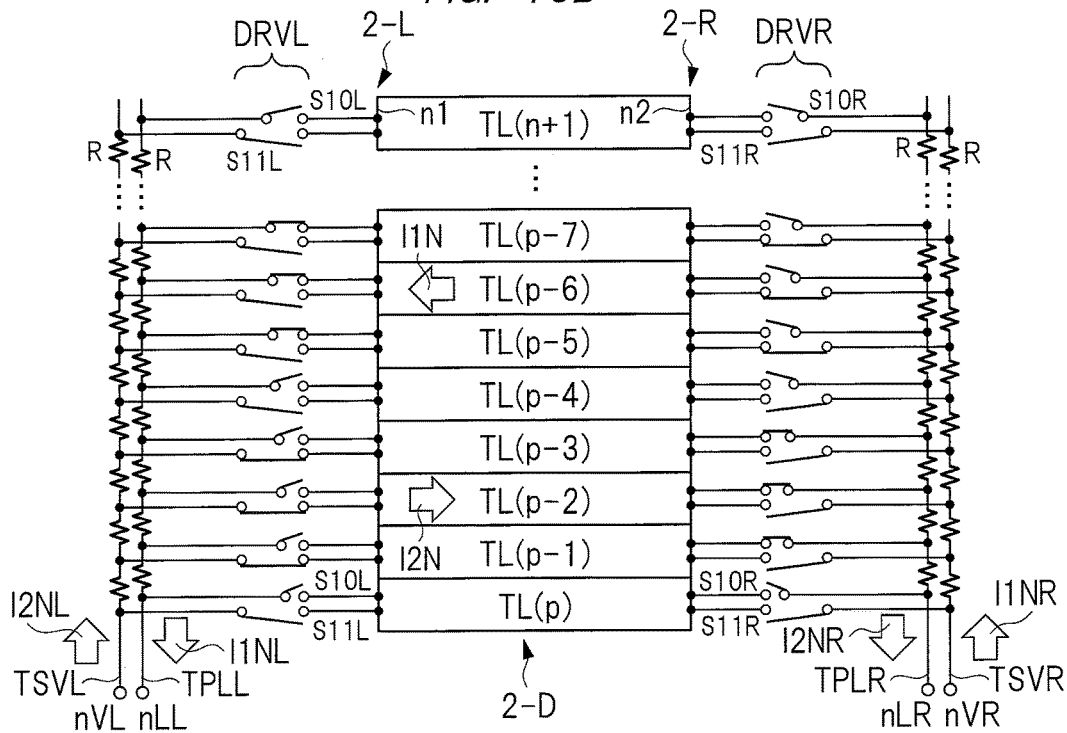

FIGS. 15A and 15B are plan views each showing a configuration of the drive circuits DRVL and DRVR and drive electrodes according to the second embodiment. FIG. 15A is a plan view of the drive electrodes arranged to be far from the respective ends nLL, nLR, nVL, and nVR of the signal lines TPLL, TPLR, TSVL, and TSVR and the corresponding drive circuits as similar to FIG. 9A, and FIG. 15B is a plan view of the drive electrodes arranged to be closer than FIG. 15A to the ends nLL, nLR, nVL, and nVR and the corresponding drive circuits.

Also in the second embodiment, the control device 3 shown in FIG. 4 supplies a driving signal TPL having a first voltage Vs to the ends nLL and nLR of the signal lines TPLL and TPLR in the magnetic field touch detection, and supplies a driving signal having a high second voltage to the ends nVL and nVR of the signal lines TSVL and TSVR.

On the other hand, in the electric field touch detection, the control device 3 forms a driving signal TSV whose voltage periodically changes, and supplies the formed driving signal TSV to the respective ends nVL and nVR of the signal lines TSVL and TSVR. The voltage of the driving signal TSV at this time changes between the first voltage Vs and the second voltage Vd, although not particularly limited. Although not particularly limited, the control device 3 forms a driving signal TPL having the first voltage Vs, and supplies the formed driving signal TPL to the respective ends nLL and nLR of the signal lines TPLL and TPLR in the electric field touch detection.

In the second embodiment, the respective sizes of the first switches S10L and S10R connectable to each of the drive electrodes are made different between the far end and the near end of the signal line, and the respective sizes of the second switches S11L and S11R are made equal for each of the drive electrodes. That is, only the respective sizes of the second switches S11L and S11R connected to the signal lines TSVL and TSVR to which the driving signal (electric field driving signal) TSV is supplied in the electric field touch detection are made the same regardless of the distance from the ends nVL and nVR of the signal lines TSVL and TSVR.

Thus, the variation in the detection sensitivity in the magnetic field touch detection is improved because the respective sizes of the first switches S10L and S10R are made large depending on the distance from the ends nLL and nLR of the signal lines, and besides, the variation in the detection sensitivity is difficult to occur even in the electric field touch detection because the respective sizes of the second switches S11L and S11R are the same. That is, the variation in the detection sensitivity depending on the arrangement location of the drive electrode can be suppressed in both operations for the magnetic field touch detection and the electric field touch detection.

<Operations for Magnetic Field Touch Detection and Electric Field Touch Detection>

Next, respective operations for magnetic field touch detection and electric field touch detection in the display apparatus according to the second embodiment will be described. This explanation will be made by using the drive electrodes TL(0) to TL(8) among the drive electrodes shown in FIG. 15 as a representative.

Figure 16:
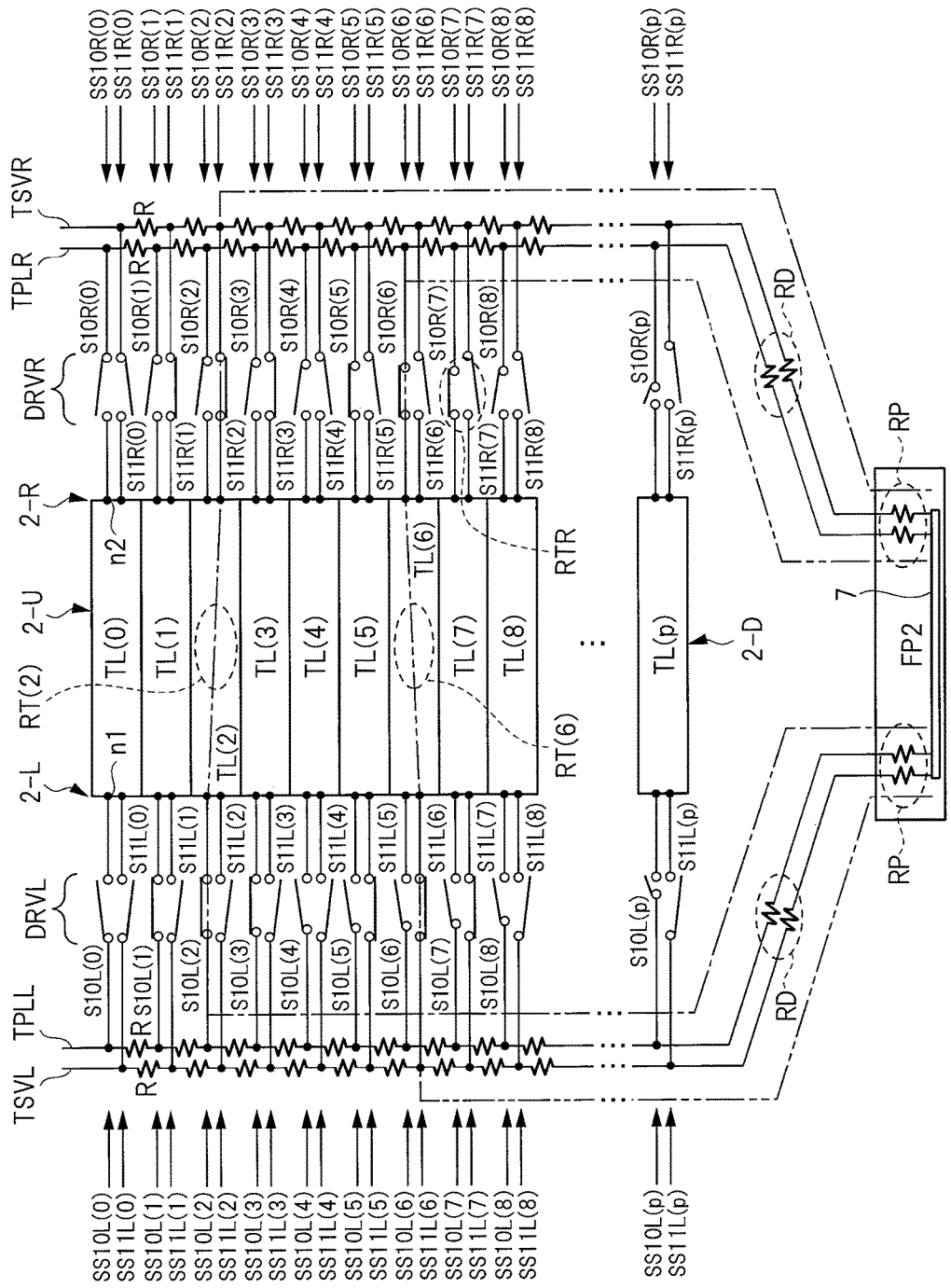
FIG. 16 is a plan view showing configurations of the drive circuit and the drive electrode according to the second embodiment.

FIG. 16 is a plan view showing a configuration of drive circuits and drive electrodes according to the second embodiment. In FIG. 16, as similar to FIG. 11, the respective sizes of first switches gradually are reduced in an order from the first switches S10L(0) and S10R(0) which are far from the flexible cable FB2 to the first switches S10L(p) and S10R(p) which are closer to the flexible cable FB2 than the far first switches S10L(0) and S10R(0). As different from FIG. 11, the respective sizes of the second switches S11L(0) to S11L(p) and S11R(0) to S11R(p) are equal regardless of the distance from the flexible cable FB2 when viewed in a plan view.

Also in FIG. 16, as similar to FIG. 11, the power supply circuit 7 forms the driving signals TPL and TSV, and supplies the formed driving signals TPL and TSV to signal lines TPLL, TPLR, TSVL and TSVR. The power supply circuit 7 is mounted on the flexible cable FB2, and an output portion of the power supply circuit 7 corresponds to each of the ends nLL, nLR, nVL, and nVR of the signal lines TPLL, TPLR, TSVL, and TSVR shown in FIG. 15.

In FIG. 16, first selection signals SS10L(0) to SS10L(8) and SS10L(p) and second selection signals SS11L(0) to SS11L(8) and SS11L(p) are output from the selection circuit SELL shown in FIG. 4. Similarly, first selection signals SS10R(0) to SS10R(8) and SS10R(p) and second selection signals SS11R(0) to SS11R(8) and SS11R(p) are output from the selection circuit SELR shown in FIG. 4.

The first selection signals SS10L(0) to SS10L(8) and SS10L(p) and the second selection signals SS11L(0) to SS11L(8) and SS11L(p), which are output from the selection circuit SELL, control the first switches S10L(0) to S10L(8) and S10L(p) and the second switches S11L(0) to S11L(8) and S11L(p) connected to the signal lines TPLL and TSVL arranged along a side 2-L of the display region, and connect the first switches and the second switches to the corresponding drive electrodes. Similarly, the first selection signals SS10R(0) to SS10R(8) and SS10R(p) and the second selection signals SS11R(0) to SS11R(8) and SS11R(p), which are output from the selection circuit SELR, control the first switches S10R(0) to SS10R(8) and S10R(p) and the second switches S11R(0) to S11R(8) and S11R(p) connected to the signal lines TPLR and TSVR arranged along a side 2-R of the display region, and connect the first switches and the second switches to the corresponding drive electrodes. Although not particularly limited, the first switch and the second switch are turned on when the corresponding first and second selection signals are at a high level, and are turned off when the corresponding first and second selection signals are at a low level. While the explanation has been made while taking the drive electrode TL(0) as an example, the same goes for each of the remaining drive electrodes.

<Operation for Magnetic Field Touch Detection>

Figure 17:
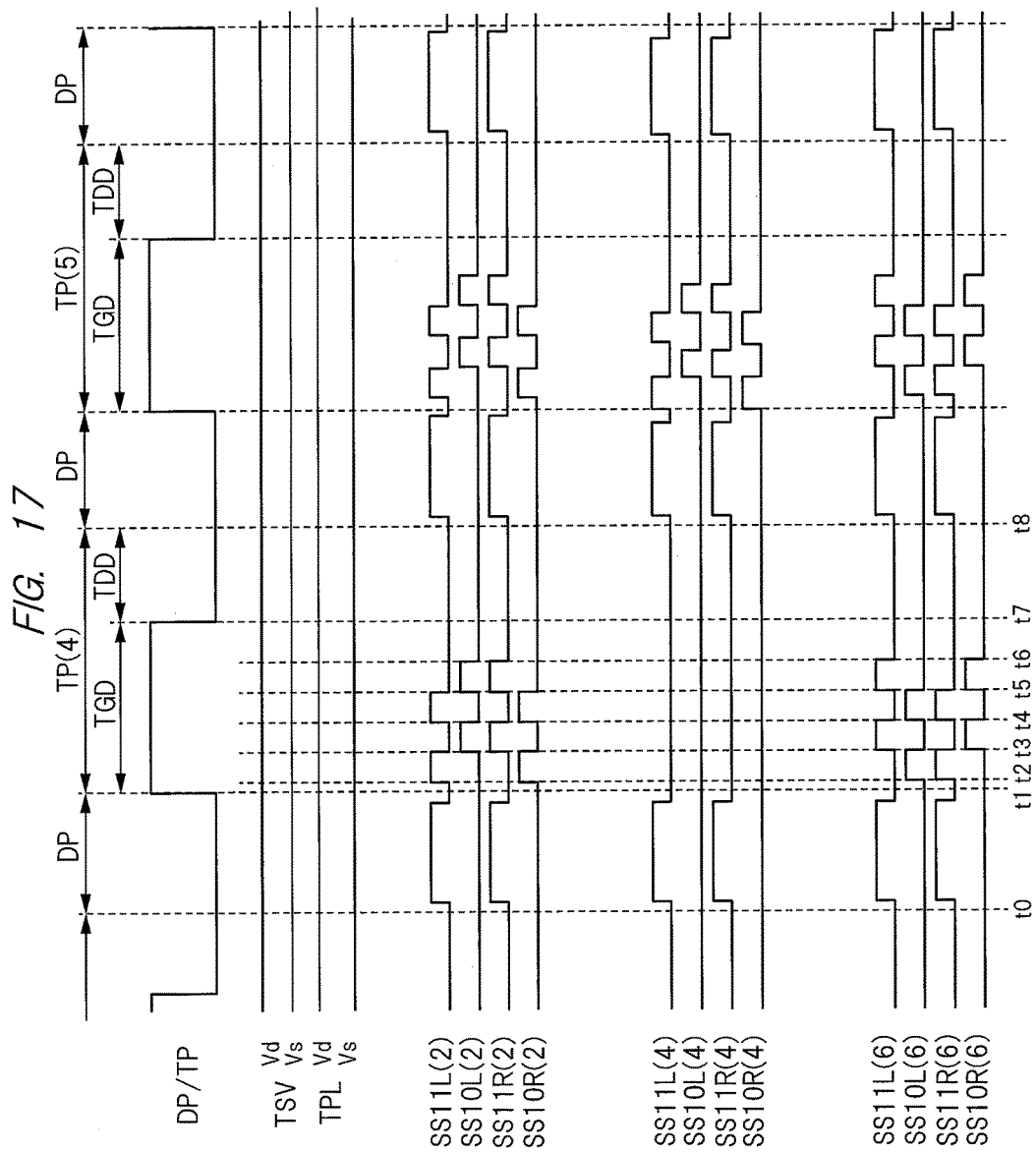
FIG. 17 is a waveform diagram for explaining an operation of magnetic-field touch detection according to the second embodiment.

FIG. 17 is a waveform diagram for explaining the operation for the magnetic field touch detection according to the second embodiment. FIG. 17 shows a case in which the display and the magnetic field touch detection are alternately performed. In FIG. 17, a reference character DP indicates a display period, reference characters TP(4) and TP(5) indicate the magnetic field touch detection periods. The magnetic field touch detection period TP(4) is a period during which a magnetic field is centrally generated in a region of the drive electrode TL(4) and a touch with a pen Pen (FIG. 2) is detected. In the display period DP subsequent to the magnetic field touch detection period TP(4), images are displayed on the display region 2. The display period DP is followed by a magnetic field touch detection period TP(5) during which a magnetic field is centrally generated in a region of the drive electrode TL(5) adjacent to the drive electrode TL(4) to detect a touch with the pen Pen.

In the second embodiment, in the display period and the magnetic field touch detection period, the driving signal TPL supplied to the signal lines TPLL and TPLR is maintained at the first voltage Vs, and the driving signal TSV supplied to the signal lines TSVL and TSVR is maintained at the second voltage Vd. At this time, the drive electrodes TL(0) to TL(p) can be used as a common electrode for display, and the first voltage Vs can be a common potential.

In FIG. 17, a period between time t0 and time t1 is the display period DP during which display is performed. When time reaches the time t1, the control device 3 starts the magnetic field touch detection period TP(4). The magnetic field touch detection period TP(4) includes a magnetic field generation period TGD and a magnetic field detection period TDD as described with reference to FIG. 2.

In the magnetic field generation period TGD in the touch detection period TP (4), the control device 3 controls the selection circuits SELL and SELR in response to the control signals CNTL and CNTR (FIG. 4) so as to centrally generate a magnetic field in the region of the drive electrode TL(4). With this control, the selection circuits SELL and SELR output the first and second selection signals selecting the drive electrodes TL(1) to TL(3) and TL(5) to TL(7) arranged so as to sandwich the drive electrode TL(4) therebetween.

In order to avoid the complicated drawing, FIG. 17 shows only the first selection signal and the second selection signal corresponding to the drive electrodes TL(2), TL(4), and TL(6). In the touch detection period TP(4), the drive electrodes TL(1) and TL(3) are selected as similar to the drive electrode TL(2), and the drive electrodes TL(5) and TL(7) are selected as similar to the drive electrode TL(6). Therefore, here, explanation will be made using the drive electrodes TL(2) and TL(4) as a representative.

The selection circuits SELL and SELR change the voltages of the first selection signal and the second selection signal corresponding to the selected drive electrode a plurality of times such as twice or more times during the magnetic field generation period TGD. In this case, the selection circuit SELL changes the voltages so that the first selection signal and the second selection signal are complimentary to each other. That is, when the first selection signal is brought into a high level (or a low level), the second selection signal is brought into a low level (or a high level). The selection circuit SELR also changes the voltages so that the first selection signal and the second selection signal are complimentary to each other. Further, the change is made so that the selection circuit SELR brings the second selection signal (or the first selection signal) into a high level when the selection circuit SELL brings the first selection signal (or the second selection signal) into a high level.

In FIG. 17, from time t2 to time t3, the selection circuit SELL brings the second selection signal SS11L(2) and the first selection signal SS10L(6) into a high level, and brings the first selection signal SS10L(2) and the second selection signal SS11L(6) into a low level. During this period, the selection circuit SELR brings the first selection signal SS10R(2) and the second selection signal SS11R(6) into a high level, and brings the first selection signal SS10R(6) and the second selection signal SS11R(2) into a low level. Thus, one end n1 of the drive electrode TL(2) shown in FIG. 16 is connected to the signal line TSVL via the second switch S11L(2), and the other end n2 thereof is connected to the signal line TPLR via the first switch S10R(2). At this time, one end n1 of the drive electrode TL(6) is connected to the signal line TPLL via the first switch S10L(6), and the other end n2 thereof is connected to the signal line TSVR via the second switch L11R(6).

The second voltage Vd is supplied to the signal lines TSVL and TSVR, and the first voltage Vs is supplied to the signal lines TPLL and TPLR. Therefore, the second voltage Vd is supplied to the one end n1 of the drive electrode TL(2) and the other end n2 of the drive electrode TL(6), and the first voltage Vs is supplied to the other end n2 of the drive electrode TL(2) and the one end of the drive electrode TL(6). Each state of the drive electrodes TL(1) and TL(3) becomes the same state as that of the drive electrode TL(2), and each state of the drive electrodes TL(5) and TL(7) becomes the same state as that of the drive electrode TL(6). Thus, each state of the drive electrodes TL(1) to TL(3) and TL(5) to TL(7) becomes a state shown in FIG. 6(B), so that the magnetic field is generated in the region of the drive electrode TL(4).

Next, from time t3 to time t4, the selection circuits SELL and SELR bring the first selection signals SS10L(2) and SS10R(6) and the second selection signals SS11L(6) and SS11R(2) into a high level, and bring the first selection signals SS10L(6) and SS10R(2) and the second selection signals SS11L(2) and SS11R(6) into a low level as shown in FIG. 17. Thus, the first switches S10L(2) and S10R(6) and the second switches 511R(2) and 511L(6) connected to the drive electrodes TL(2) and TL(6) are turned on as shown in FIG. 16. Each state of the drive electrodes TL(1) and TL(3) becomes the same state as that of the drive electrode TL(2), and each state of the drive electrodes TL(5) and TL(7) becomes the same state as that of the drive electrode TL(6). Thus, each state of the drive electrodes TL(1) to TL(3) and TL(5) to TL(7) becomes a state shown in FIG. 6A, so that the magnetic field is generated in the region of the drive electrode TL(4).

Thereafter, the above-described operation is repeated in the magnetic field generation period TGD to generate the magnetic field in the region of the drive electrode TL(4) each time. While FIG. 17 shows an example in which the first selection signal and the second selection signal are changed four times, the present invention is not limited to this number of times. The first selection signal and the second selection signal may be changed once, or twice or more times.

A period from time t7 to time t8 is assigned to the magnetic field detection period TDD. In the magnetic field detection period TDD, as shown in FIG. 2B, the magnetic field from the pen Pen is detected by using a detection electrode.

In the magnetic field touch detection period TP(4), note that the low-level first selection signals SS10L(4) and SS10R(4) and the low-level second selection signals SS11L(4) and SS11R(4) are supplied to the first switches S10L and S10R and the second switches S11L and S11R connected to the drive electrode excluding the drive electrode to be selected, e.g., to the drive electrode TL(4), so that the first switches and the second switches are turned off. Thus, when the voltage of the selected drive electrode changes, a capacitance to be charged or discharged can be reduced.

When a procedure proceeds to the magnetic field touch detection period TP(5), the control device 3 controls the selection circuits SELL and SELR so as to form such first and second selection signals as selecting the drive electrodes TL(2) to TL(4) and TL(6) to TL(8) arranged so as to sandwich the drive electrode TL(5) therebetween to generate the magnetic field in the region of the drive electrode TL(5). Thus, in the magnetic field generation period TGD, the first and second selection signals corresponding to the drive electrodes TL(2) to TL(4) and TL(6) to TL(8) are changed a plurality of times as similar to the above description to generate the magnetic field. Then, in the magnetic field detection period TDD, the magnetic field from the pen Pen is detected. Thereafter, the above-described operation is repeated, so that the touch with the pen Pen is detected, and the touched coordinates are extracted.

<Operation for Electric Field Touch Detection>

Figure 18:
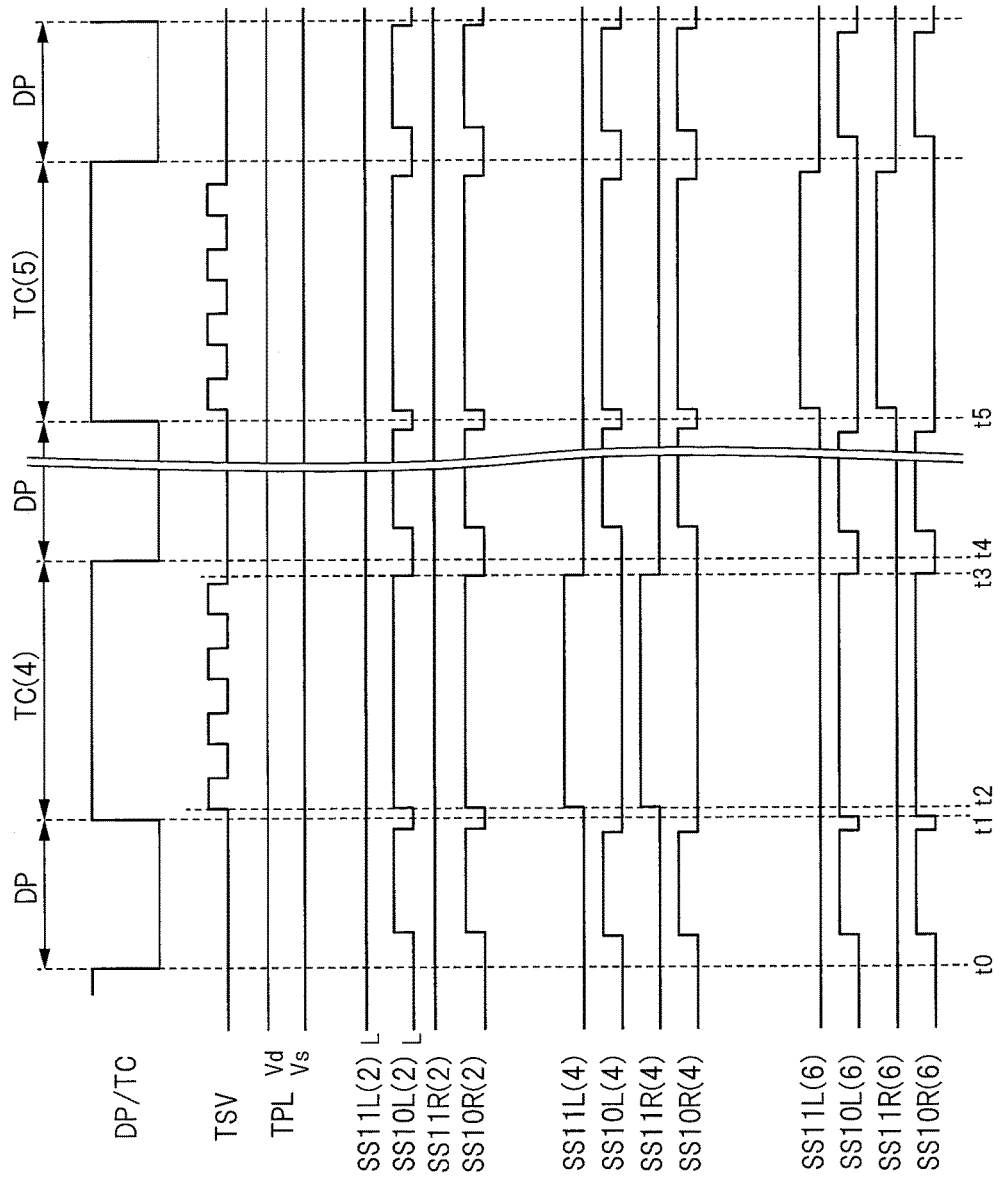
FIG. 18 is a waveform diagram for explaining an operation of electric-field touch detection according to the second embodiment.

Next, an operation for the electric field touch detection will be described. FIG. 18 is a waveform diagram showing the operation for the electric field touch detection according to the second embodiment. Also here, a case in which display and electric field touch detection are alternately performed will be described. FIG. 18 shows waveforms in the electric field touch detection period TC(4) during which the touch with the finger is detected in the region of the drive electrode TL(4) and the electric field touch detection period TC(5) during which the touch with the finger is detected in the region of the drive electrode TL(6). Note that a reference character DP indicates the display period as similar to FIG. 17. FIG. 18 shows only first selection signals and second selection signals corresponding to the drive electrodes TL(2), TL(4), TL(6) among the first selection signals and the second selection signals corresponding to the drive electrode as similar to FIG. 17. In FIG. 18, note that a reference character "L" described in the second selection signal means a low level.

In the electric field touch detection, the control device 3 controls a power supply circuit so that a driving signal TSV output from the power supply circuit periodically changes in the electric field touch detection period. The power supply circuit outputs a driving signal TPL having a first voltage Vs. Of course, the control device 3 may form the periodically changing driving signal TSV and the driving signal TPL having the first voltage Vs in the electric field touch detection period.

When the display is performed from time t0 and time t1, and then, a procedure proceeds to the electric field touch detection period TC(4) at time t1, the control device 3 controls the selection circuits SELL and SELR in response to the control signals CNTL and CNTR so as to bring the second selection signals corresponding to the selected drive electrode into a high level and bring the first selection signals corresponding to the non-selected drive electrode into a high level (FIG. 4). With this control, at time t2, the selection circuits SELL and SELR bring the second selection signals SS11L(4) and SS11R(4) corresponding to the selected drive electrode TL(4) into a high level and bring the first selection signals SS10L(4) and SS10R(4) into a low level.

And, at time t2, the selection circuits SELL and SELR bring the first selection signals SS10L(2) and SS10R(2) corresponding to the non-selected drive electrode TL(2) into a high level and bring the second selection signals SS11L(2) and SS11R(2) into a low level. Similarly, at time t2, the selection circuits SELL and SELR bring the first selection signals SS10L(6) and SS10R(6) corresponding to the non-selected drive electrode TL(6) into a high level and bring the second selection signals SS11L(6) and SS11R(6) into a low level.

When the second selection signals SS11L(4) and SS11R(4) corresponding to the drive electrode TL(4) are brought to the high level, the one end n1 of the drive electrode TL(4) is connected to the signal line TSVL via the second switch S11L(4), and the other end n2 thereof is connected to the signal line TSVR via the second switch S11R(4). Since the driving signal (electric field driving signal) TSV whose voltage periodically changes is supplied to the signal lines TSVL and TSVR, a periodically changing driving signal is supplied to both the ends n1 and n2 of the selected drive electrode TL(4) via the second switches S11L(4) and S11R(4). Therefore, an electric field which changes in accordance with the change of the driving signal is generated.

In the electric field touch detection period TC(4), it is detected whether the electric field is changed by the finger or not as described with reference to FIG. 3. In this manner, the touch with the finger can be detected.

In the electric field touch detection period TC(4), the first switches (e.g., S10L(2) and S10R(2)) connected between both ends n1 and n2 of the non-selected drive electrode (e.g., TL(2)) and the signal lines TPLL and TPLR are turned on so that the driving signal TPL is supplied although not particularly limited. As a result, occurrence of noises can be suppressed. In the second embodiment, the control device 3 may fix signal lines SL(0) to SL(p) at a predetermined voltage in the electric field touch detection period. Thus, the noises can be further reduced.

At time t3, the selection circuits SELL and SELR bring the first and second selection signals into a low level. At time t4, the electric field touch detection period TC(4) ends.

Thereafter, when the procedure proceeds to time t5 through the display period DP and the electric field touch detection period), the procedure proceeds to the electric field touch detection period TC(5). In the electric field touch detection period TC(5), the drive electrode TL(6) is selected so as to bring the second selection signal corresponding to this selected drive electrode into a high level and bring the first selection signal corresponding to the remaining drive electrode into a high level. Thus, as similar to the electric field touch detection period TC(4), the electric field is generated in the selected drive electrode TL(6), and the touch with the finger is detected. Thereafter, the electric field touch detection is similarly performed.

Note that the drive electrodes TL(1) to TL(3) shown in FIG. 16 can be considered as the first drive electrode, the drive electrodes TL(5) to TL(7) therein can be considered as the second drive electrode, and the drive electrode TL(4) therein can be considered as the third drive electrode. In the magnetic field generation period, the magnetic fields generated by the first drive electrode and the third drive electrode are superimposed around the region of the third drive electrode TL(4). While the electric field touch detection has been described by using the drive electrodes TL(4) and TL(5) in FIG. 18, the electric field touch detection is of course similarly performed in the drive electrodes TL(1) to TL(3) and others. In the magnetic field touch detection in the present embodiment, three adjacent drive electrodes are used as the first drive electrode (second drive electrode). On the other hand, in the electric field touch detection therein, one drive electrode is used. That is, the number of drive electrodes to which the driving signal is simultaneously supplied is larger in the magnetic field touch detection than the electric field touch detection.

In the first and second embodiments, as described with reference to FIG. 5, the drive circuit DRVL having the first switch and the second switch is arranged between the side 2-L of the display region 2 and the long side 500-L of the display module 500, and the drive circuit DRVR having the first switch and the second switch is arranged between the side 2-R of the display region 2 and the long side 500-R of the display module 500. The change in the detection sensitivity depending on the position can be reduced by only the adjustment of the respective sizes of the switches configuring the drive circuits DRVL and DRVR without addition of a component and/or a line to a frame on the long side. Thus, increase in a size of the frame on the long side can be prevented.

In the scope of the concept of the present invention, various modification examples and alteration examples could have been easily thought up by those who skilled in the art, and it would be understood that these various modification examples and alteration examples belong to the scope of the present invention.

For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

For example, the explanation has been made in the case in which the signal lines TPLL, TPLR, TSVL, and TSVR extend in the vertical direction, and in which the drive electrodes TL(0) to TL(p) extend in the horizontal direction and are arranged in parallel to one another in the vertical direction. However, the vertical direction and the horizontal direction change depending on a viewpoint. Even if the respective extending directions of the signal lines and the drive electrodes are changed by changing the viewpoint, the change is included in the scope of the present invention. The term "parallel" used in the present specification means extension from one end to the other end without crossing. Thus, even if a part or whole of one line (or electrode) is provided while being inclined to the other line (or electrode), this state also means being "parallel" in the present specification unless the lines cross each other from one end to the other end.

What is claimed is:

1. An input detection device comprising:
   a first signal line and a second signal line each having an end directly connected to a driving signal circuit which supplies a driving signal and arranged so as to extend in a first direction;
   a plurality of drive electrodes extending in a second direction intersecting the first direction and arranged in the first direction between the first signal line and the second signal line for touch detection, the plurality of drive electrodes includes a first drive electrode and a second drive electrode which is farther from the end of each of the first and second signal lines;
   a first plurality of switches each directly connected to a corresponding drive electrode of the plurality of drive electrodes and the first signal line, the first plurality of switches includes a first switch and a second switch which is farther than the first switch from the end of the first signal line;
   a second plurality of switches each directly connected to the corresponding drive electrode of the plurality of drive electrodes and the second signal line, the second plurality of switches includes a third switch and a fourth switch which is farther than the third switch from the end of the second signal line; and
   wherein a size of the first switch is smaller than that of the second switch, and a size of the third switch is smaller than that of the fourth switch.

2. The input detection device according to claim 1,
   wherein each size of the first switch, the second switch, the third switch, and the fourth switch is a size of a channel width of a transistor configuring each of the first switch, the second switch, the third switch, and the fourth switch.

3. The input detection device according to claim 1,
   wherein the driving signal supplied to the first signal line has a first voltage, and
   the driving signal supplied to the second signal line has a second voltage having an absolute value of a voltage value larger than an absolute value of the first voltage.

4. The input detection device according to claim 3,
   wherein each of the first voltage and the second voltage is a direct-current voltage.

5. The input detection device according to claim 1,
   wherein the first signal line and the second signal line extend along one ends and the other ends of the plurality of drive electrodes, and
   the first plurality of switches can connect the first signal line and the one ends and the other ends of the plurality of drive electrodes, and the second plurality of switches can connect the second signal line and the one ends and the other ends of the plurality of drive electrodes.

6. The input detection device according to claim 5,
   wherein, when an external object is detected based on change in magnetic field, one end of the first drive electrode and the first signal line are directly connected to each other by the first switch, and the other end of the first drive electrode and the second signal line are directly connected to each other by the third switch.

7. The input detection device according to claim 6, wherein, when the external object is detected based on change in electric field, the one end and the other end of the first drive electrode are connected to the second signal line by the third switch.

8. The input detection device according to claim 7, wherein, when the external object is detected based on change in the magnetic field, the first drive electrode includes a plurality of drive electrodes adjacent to one another.

9. The input detection device according to claim 8, wherein the number of drive electrodes included in the first drive electrode required when the external object is detected based on the change in the magnetic field is larger than the number of drive electrodes included in the first drive electrode required when the external object is detected based on the change in the electric field.

10. The input detection device according to claim 5, wherein, when an external object is detected based on change in magnetic field, one end of the first drive electrode is directly connected to the first signal line extending along the one ends of the plurality of drive electrodes by the first switch, and the other end of the first drive electrode is directly connected to the second signal line extending along the other ends of the plurality of drive electrodes by the third switch, when the external object is detected based on change in magnetic field, one end of the second drive electrode is directly connected to the second signal line extending along the one ends of the plurality of drive electrodes by the fourth switch, and the other end of the second drive electrode is directly connected to the first signal line extending along the other ends of the plurality of drive electrodes by the second switch, and when the external object is detected based on the change in the magnetic field, a third drive electrode not connected to the first signal line and the second signal line exists between the first drive electrode and the second drive electrode.

11. The input detection device according to claim 10, wherein each of the first drive electrode and the second drive electrode includes a plurality of drive electrodes adjacent to one another.

12. The input detection device according to claim 1, wherein each of the first plurality of switches and the second plurality of switches includes a transistor, the transistor of the first switch connected to be close to the end of the first signal line has a smaller channel width than a channel width of the transistor of the second switch connected to be farther than the first switch from the end of the first signal line, and the transistor of the third switch connected to be close to the end of the second signal line has the same channel width as a channel width of the transistor of the fourth switch connected to be farther than the third switch from the end of the second signal line.

\* \* \* \* \*